United States Patent
Wu et al.

(10) Patent No.: US 9,721,313 B2
(45) Date of Patent: Aug. 1, 2017

(54) METHOD AND DEVICE FOR IDENTIFYING FEASIBILITY OF TRANSMISSION INTERFACE CONSTRAINT IN ONLINE ROLLING DISPATCHING

(71) Applicant: Tsinghua University, Beijing (CN)

(72) Inventors: Wenchuan Wu, Beijing (CN); Boming Zhang, Beijing (CN); Hongbin Sun, Beijing (CN); Zhigang Li, Beijing (CN); Qinglai Guo, Beijing (CN)

(73) Assignee: Tsinghua University (CN)

(*) Notice: Subject to any disclaimer, the term of this patent is extended or adjusted under 35 U.S.C. 154(b) by 838 days.

(21) Appl. No.: 14/143,474

(22) Filed: Dec. 30, 2013

(65) Prior Publication Data

US 2015/0088470 A1    Mar. 26, 2015

(30) Foreign Application Priority Data

Sep. 24, 2013   (CN) .......................... 2013 1 0439186

(51) Int. Cl.
    *G06F 17/10*    (2006.01)
    *G06Q 50/06*    (2012.01)
    *G06F 17/11*    (2006.01)

(52) U.S. Cl.
    CPC ............. *G06Q 50/06* (2013.01); *G06F 17/11* (2013.01)

(58) Field of Classification Search
    None
    See application file for complete search history.

(56) References Cited

U.S. PATENT DOCUMENTS 7,085,660 B2 *  8/2006  Mansingh ............... G06Q 50/06
                                                 700/291
7,343,360 B1 *  3/2008  Ristanovic ............. G06Q 30/08
                                                 705/412

OTHER PUBLICATIONS

Wu et al. Multiple Time-Scale Coordinated Power Control System to Accommodate Significant Power Penetration and Its Real Application IEEE Jul. 2012.*
Niu et al. A Novel Social-Environmental-Economic Dispatch Model for Thermal/Wind Power Generation and Application ICIC International, vol. 9 No. 7, Jul. 2013, pp. 3005-3014.*
Ding et al. A Control Loop Approach for Integrating the Future Dencentrolized Power Markets and Grids IEEE SmartGridComm Symposium, 2013.*

* cited by examiner

*Primary Examiner* — Omar Fernandez Rivas
*Assistant Examiner* — Cuong Luu
(74) *Attorney, Agent, or Firm* — Lerner, David, Littenberg, Krumholz & Mentlik, LLP

(57) ABSTRACT

A method and a device for identifying a feasibility of a transmission interface constraint in an online rolling dispatching are provided. The method comprises: S1, establishing an online rolling dispatching model including a transmission interface constraint; S2, establishing a Lagrangian relaxation dual problem of the online rolling dispatching model; and S3, identifying a feasibility of the transmission interface constraint by solving the Lagrangian relaxation dual problem.

15 Claims, 1 Drawing Sheet

METHOD AND DEVICE FOR IDENTIFYING FEASIBILITY OF TRANSMISSION INTERFACE CONSTRAINT IN ONLINE ROLLING DISPATCHING

CROSS-REFERENCE TO RELATED APPLICATION

This application claims priority from Chinese Patent Application Serial No. 201310439186.6, filed with the State Intellectual Property Office of P. R. China on Sep. 24, 2013, the disclosure of which is incorporated herein by reference.

BACKGROUND OF THE INVENTION

The present disclosure relates to a power system operation and control field, and more particularly to a method for identifying a feasibility of a transmission interface constraint in an online rolling dispatching and a device for identifying a feasibility of a transmission interface constraint in an online rolling dispatching.

Multi-timescale dispatching can effectively respond to the operating indeterminacy in the power system, in which the online rolling dispatching is an important part of the multi-timescale dispatching. The online rolling dispatching can correct the generation plan by rolling in the power system based on the current operating status and the forecasted load data, so that it eliminates the bias between the generation planning load and the actual load to ensure the economy and the security of the power system.

Currently, the classic dynamic economic dispatching is used in the online rolling dispatching. The classic dynamic economic dispatching allocates the affordable load power of each generator in an on state to achieve the minimum generating cost basing on a plurality of physical constraints such as the load balancing, the output power limit of the generator and the output ramp rate limit of the generator. In practical applications, in addition to physical constraints, the security constraints need to be considered, in which the transmission interface constraint is one of the important security constraints.

However, there are some problems: in order to ensure the safe and stable operation of the power system, the operators left the large margin for the limit of the active power flow of the transmission interface, and therefore the limit of the active power flow is conservative. As the large-scale renewable energy generation is connected to the power grid, the power system size is expanded constantly, so that the conservative limit of the active power flow restricts the use of renewable energy, obstructs the economic operation of the power system, and even leads to the infeasible operation.

BRIEF SUMMARY OF THE INVENTION

Embodiments of the present disclosure seek to solve at least one of the problems existing in the related art to at least some extent.

One objective of the present disclosure is to provide a method for identifying a feasibility of a transmission interface constraint in an online rolling dispatching, which improves the robustness and the practicality of the online rolling dispatching.

Another objective of the present disclosure is to provide a device for identifying a feasibility of a transmission interface constraint in an online rolling dispatching.

Yet another objective of the present disclosure is to provide a computer readable storage medium.

According to a first aspect of the present disclosure, a method for identifying a feasibility of a transmission interface constraint in an online rolling dispatching is provided. The method comprises steps of: S1, establishing an online rolling dispatching model including a plurality of transmission interface constraints; S2, establishing a Lagrangian relaxation dual problem of the online rolling dispatching model; and S3, identifying a plurality of feasibilities of the plurality of transmission interface constraints by solving the Lagrangian relaxation dual problem.

In some embodiments, step S1 comprises:

S11, obtaining a dispatching period and a dispatching interval;

S12, obtaining a number of dispatching intervals according to the dispatching period and the dispatching interval;

S13, obtaining a plurality of quadratic coefficients, a plurality of linear coefficients and a plurality of constant coefficients of generating costs of a plurality of generators;

S14, obtaining a plurality of generation shift distribution factors of the plurality of generators to corresponding transmission interfaces in the plurality of transmission interfaces;

S15, establishing the online rolling dispatching model according to the number of the dispatching intervals, the plurality of quadratic coefficients, the plurality of linear coefficients, the plurality of constant coefficients and the plurality of generation shift distribution factors, wherein the online rolling dispatching model is expressed according to formula (1).

$$\min_{p} C(p) = \sum_{T=1}^{T} \sum_{i=1}^{N_g} (a_{i,t} \cdot p_{i,t}^2 + b_{i,t} \cdot p_{i,t} + c_{i,t}) \quad (1)$$

subject to, $$\sum_{i=1}^{N_g} p_{i,t} = D_t, \forall t = 1, 2, \ldots, T \quad (a)$$

$$\underline{L}_{k,t} \le \sum_{i=1}^{N_g} G_{k,i} \cdot p_{i,t} \le \overline{L}_{k,t}, \forall k = 1, 2, \ldots, K, t = 1, 2, \ldots, T \quad (b)$$

$$H_i(p_i) \le 0, \forall i = 1, 2, \ldots, N_g \quad (c)$$

where t represents a $t^{th}$ dispatching interval, T represents the number of the dispatching intervals, i represents an $i^{th}$ generator, $N_g$ represents a number of the generators, K represents a number of the transmission interfaces corresponding to the $i^{th}$ generator, k represents a $k^{th}$ transmission interface corresponding to the $i^{th}$ generator, p represents a first decision vector, in which $p=[p_1, p_2, \ldots, p_i, \ldots, p_{N_g}]$, $p_i=[p_{i,1}, p_{i,2}, \ldots, p_{i,t}, \ldots, p_{i,T}]$ represents an active power vector of the $i^{th}$ generator, $a_{i,t}$, $b_{i,t}$ and $c_{i,t}$ represent a quadratic coefficient, a linear coefficient and a constant coefficient of the $i^{th}$ generator in the $t^{th}$ dispatching interval respectively; formula (1)(a) represents a plurality of minimum generating cost constraints, where $p_{i,t}$ represents an active power of the $i^{th}$ generator in the $t^{th}$ dispatching interval, $D_t$ represents a forecasted load value in the $i^{th}$ dispatching interval; formula (1)(b) represents the plurality of transmission interface constraints, where $\underline{L}_{k,t}$ represents a lower limit of an active power flow of the $k^{th}$ transmission interface in the $t^{th}$ dispatching interval, $\overline{L}_{k,t}$ represents an upper limit of the active power flow of the $k^{th}$ transmission interface in the $t^{th}$ dispatching interval, $G_{k,i}$ represents an generation shift distribution factor of the $i^{th}$ generator to the $k^{th}$ transmission interface; formula (1)(c) represents a plurality of physical constraints.

In some embodiments, the Lagrangian relaxation dual problem is expressed according to formula (2), $$\max_{(\lambda,\underline{\omega},\overline{\omega})} q(\lambda, \underline{\omega}, \overline{\omega}) \qquad (2)$$

subject to, $$\underline{\omega}, \overline{\omega} \geq 0$$

where $q(\lambda,\underline{\omega},\overline{\omega})$ represents a Lagrange dual function in the Lagrangian relaxation dual problem, $\lambda$, $\overline{\omega}$ and $\underline{\omega}$ represent Lagrange multiplier vectors, $\lambda=[\lambda_1, \lambda_2, \ldots, \lambda_T]$, $\underline{\omega}=[\underline{\omega}_{1,1}, \underline{\omega}_{1,2}, \ldots, \underline{\omega}_{1,T}, \ldots, \underline{\omega}_{K,1}, \underline{\omega}_{K,2}, \ldots, \underline{\omega}_{K,T}]$, $\overline{\omega}=[\overline{\omega}_{1,1}, \overline{\omega}_{1,2}, \ldots, \overline{\omega}_{1,T}, \ldots, \overline{\omega}_{K,1}, \overline{\omega}_{K,2}, \ldots, \overline{\omega}_{K,T}]$, in which the Lagrange dual function is expressed according to formula (3), $$q(\lambda, \underline{\omega}, \overline{\omega}) = \sum_{i=1}^{N_g} q_i(\lambda, \underline{\omega}, \overline{\omega}) + K(\lambda, \underline{\omega}, \overline{\omega}) \qquad (3)$$

where $q_i(\lambda,\underline{\omega},\overline{\omega})$ represents a child Lagrange dual function corresponding to the $i^{th}$ generator, in which the child Lagrange dual function is expressed according to formula (4), $$q_i(\lambda, \underline{\omega}, \overline{\omega}) = \min_{p_i}\{L_i(p_i, \lambda, \underline{\omega}, \overline{\omega}) \mid p_i \text{ is subject to } H_i(p_i) \leq 0\} \qquad (4)$$

where $L_i(p_i,\lambda,\underline{\omega},\overline{\omega})$ represents a child Lagrange function corresponding to the $i^{th}$ generator, in which the child Lagrange function is expressed according to formula (5), $$L_i(p_i, \lambda, \underline{\omega}, \overline{\omega}) = \sum_{T=1}^{T}\left\{a_{i,t} \cdot p_{i,t}^2 + \left[b_{i,t} - \lambda_t + \sum_{k=1}^{K} G_{k,t} \cdot (\overline{\omega}_{k,t} - \underline{\omega}_{k,t})\right]\right\} \qquad (5)$$

where $K(\lambda,\underline{\omega},\overline{\omega})$ is expressed according to formula (6), $$K(\lambda, \underline{\omega}, \overline{\omega}) = \sum_{t=1}^{T}\left[\lambda_t \cdot D_t + \sum_{k=1}^{K}(\underline{\omega}_{k,t} \cdot \underline{L}_{k,t} - \overline{\omega}_{k,t} \cdot \overline{L}_{k,t})\right]. \qquad (6)$$

In some embodiments, step S3 comprises:

S31, initializing an iteration number m, the Lagrange multiplier vectors, an approximate matrix, an existing flag of an infeasible transmission interface constraint and a plurality of feasible flags of the plurality of transmission interface constraints;

S32, obtaining an infinite norm of subgradients of the Lagrange multipliers at a $m^{th}$ iteration;

S33, judging whether the infinite norm is converged;

S34, if yes, outputting a plurality of pieces of feasibility information of the plurality of transmission interface constraints according to the existing flag and the plurality of feasible flags;

S35, if no, judging whether there is an infeasible transmission interface constraint;

S351, if yes, updating the existing flag and the plurality of feasible flags, and identifying the infeasible transmission interface constraint and repeating step S31;

S352, if no, updating the Lagrange multiplier vectors and the approximate matrix, and setting m=m+1;

S36, judging whether m is greater than a preset value;

S37, if no, repeating step S33;

S38, if yes, outputting a plurality of pieces of feasibility information of the plurality of transmission interface constraints according to the existing flag and the plurality of feasible flags.

In some embodiments, step S32 comprises:

obtaining the subgradients of the Lagrange multipliers at the $m^{th}$ iteration according to formula (7), $$\begin{cases} g_{\lambda_t}^m = D - \sum_{i=1}^{N_g} p_{i,t}^m, & \forall t = 1, 2, \ldots, T \\ g_{\underline{\omega}_{k,t}}^m = \underline{L}_{k,t} - \sum_{i=1}^{N_g} G_{k,i} \cdot p_{i,t}^m, & \forall k = 1, 2, \ldots, K, t = 1, 2, \ldots, T \\ g_{\overline{\omega}_{k,t}}^m = \sum_{i=1}^{N_g} G_{k,i} \cdot p_{i,t}^m - \overline{L}_{k,t}, & \forall k = 1, 2, \ldots, K, t = 1, 2, \ldots, T \end{cases} \qquad (7)$$

where m represents the $m^{th}$ iteration, $\lambda_t$ represents a Lagrange multiplier in the $t^{th}$ dispatching interval, $\underline{\omega}_{k,t}$ represents a Lagrange multiplier of the $k^{th}$ transmission interface in the $t^{th}$ dispatching interval, $\overline{\omega}_{k,t}$ represents a Lagrange multiplier of the $k^{th}$ transmission interface in the $t^{th}$ dispatching interval, $g_{\lambda_t}^m$ represents a subgradient of the Lagrange multiplier $\lambda_t$ in the $t^{th}$ dispatching interval at the $m^{th}$ iteration, $g_{\underline{\omega}_{k,t}}^m$ represents a subgradient of the Lagrange multiplier $\underline{\omega}_{k,t}$ of the $k^{th}$ transmission interface in the $t^{th}$ dispatching interval at the $m^{th}$ iteration, $g_{\overline{\omega}_{k,t}}^m$ represents a subgradient of the Lagrange multiplier $\overline{\omega}_{k,t}$ of the $k^{th}$ transmission interface in the $t^{th}$ dispatching interval at the $m^{th}$ iteration;

obtaining the infinite norm of the subgradients according to formula (8), $$g_{\infty}^{(m)} = \max\{|g_{\lambda_t}^{(m)}|, |g_{\underline{\omega}_{k,t}}^{(m)}|, |g_{\overline{\omega}_{k,t}}^{(m)}| \| \forall t=1,2,\ldots,T, k=1,2,\ldots,K\} \qquad (8).$$

In some embodiments, step S35 comprises:

obtaining an upper limit of the Lagrange dual function according to formula (9), $$\overline{C} = \sum_{t=1}^{T}\sum_{i=1}^{N_g}[a_{i,t} \cdot (P_{i,t}^{max})^2 + b_{i,t} \cdot P_{i,t}^{max} + c_{i,t}], \qquad (9)$$

where $\overline{C}$ represents the upper limit of the Lagrange dual function, $P_{i,t}^{max}$ represents a maximum active power of the $i^{th}$ generator in the $t^{th}$ dispatching interval;

obtaining an optimal solution $P_i^m$ of formula (4) by traversing all generators;

obtaining $q_i(\lambda^m,\underline{\omega}^m,\overline{\omega}^m)$ according to the optimal solution $P_i^m$;

judging whether $q_i(\lambda^m,\underline{\omega}^m,\overline{\omega}^m)$ is greater than the upper limit of the Lagrange dual function.

In some embodiments, step S351 comprises:

S3511, setting flag=0, where flag represents the existing flag;

S3512, setting k=1, where k represents a number of cycles;

S3513, obtaining an intermediate parameter $q'_k=q(\lambda^{(m)}, E_k(\underline{\omega}^{(m)}), E_k(\overline{\omega}^{(m)}))$ according to formula (3) and judging whether $q'_k=q(\lambda^{(m)}, E_k(\underline{\omega}^{(m)}), E_k(\overline{\omega}^{(m)}))$ is greater than the upper limit of the Lagrange dual function, wherein $E_k(\underline{\omega}^{(m)})$ and $E_k(\overline{\omega}^{(m)})$ are expressed according to formula (10), $$\begin{cases} E_k(\underline{\omega}^{(m)}) = [0, 0, \ldots, 0, \underline{\omega}_{k,1}^{(m)}, \underline{\omega}_{k,2}^{(m)}, \ldots, \underline{\omega}_{k,T}^{(m)}, 0, \ldots, 0] \\ E_k(\overline{\omega}^{(m)}) = [0, 0, \ldots, 0, \overline{\omega}_{k,1}^{(m)}, \overline{\omega}_{k,2}^{(m)}, \ldots, \overline{\omega}_{k,T}^{(m)}, 0, \ldots, 0] \end{cases} \quad (10)$$

S3514, if yes, setting $f_k=1$ and flag=1, where $f_k$ represents the feasible flag of the $k^{th}$ transmission interface constraint, and going to step S3516;

S3515, if no, setting k=k+1 and flag=0, and judging whether k is greater than K;

S35151, if no, repeating step S3513;

S35152, if yes, going to step S3516;

S3516, judging whether flag is 1;

S3517, if no, going to step S352;

S3518, if yes, traversing $f_k$, where k=1, 2, ..., K, if $f_k=1$, setting the lower limit of the active power flow of the $k^{th}$ transmission interface constraint in the $t^{th}$ dispatching interval $\underline{L}_{k,t}=-\infty$, $\forall t=1, 2, \ldots, T$ and the upper limit of the active power flow of the $k^{th}$ transmission interface constraint in the $t^{th}$ dispatching interval $\overline{L}_{k,t}=+\infty$, $\forall t=1, 2, \ldots, T$, and repeating step S31; if $f_k=0$, maintaining the lower limit and the upper limit of the active power flow of the $k^{th}$ transmission interface constraint in the $t^{th}$ dispatching interval constant, and repeating step S31.

In some embodiments, step S352 comprises:

obtaining correction directions of the Lagrange multiplier vectors according to formula (11), $$[d_\lambda^{(m)}, d_{\underline{\omega}}^{(m)}, d_{\overline{\omega}}^{(m)}] = B^{(m)} \cdot [g_\lambda^{(m)}, g_{\underline{\omega}}^{(m)}, g_{\overline{\omega}}^{(m)}] \quad (11)$$

where $d_\lambda^{(m)}$, $d_{\underline{\omega}}^{(m)}$ and $d_{\overline{\omega}}^{(m)}$ represent the correction directions, in which $d_\lambda^{(m)}=[d_{\lambda_1}^{(m)}, d_{\lambda_2}^{(m)}, \ldots, d_{\lambda_T}^{(m)}]$, $d_{\underline{\omega}}^{(m)} = [d_{\underline{\omega}_{1,1}}^{(m)}, d_{\underline{\omega}_{1,2}}^{(m)}, \ldots, d_{\underline{\omega}_{1,T}}^{(m)}, \ldots, d_{\underline{\omega}_{K,T}}^{(m)}]$ and $d_{\overline{\omega}}^{(m)}=[d_{\overline{\omega}_{1,1}}^{(m)}, d_{\overline{\omega}_{1,2}}^{(m)}, \ldots, d_{\overline{\omega}_{1,T}}^{(m)}, \ldots, d_{\overline{\omega}_{K,T}}^{(m)}]$, $B^{(m)}$ represents the approximate matrix;

updating the Lagrange multiplier vectors according to formula (12), $$\begin{cases} \lambda_t^{(m+1)} = \lambda_t^{(m)} + \alpha \cdot d_{\lambda_t}^{(m)}, & \forall t=1, 2, \ldots, T \\ \underline{\omega}_{k,t}^{(m+1)} = \max\{\underline{\omega}_{k,t}^{(m)} + \alpha \cdot d_{\underline{\omega}_{k,t}}^{(m)}, 0\}, & \forall k=1, 2, \ldots, K, t=1, 2, \ldots, T \\ \overline{\omega}_{k,t}^{(m+1)} = \max\{\overline{\omega}_{k,t}^{(m)} + \alpha \cdot d_{\overline{\omega}_{k,t}}^{(m)}, 0\}, & \forall k=1, 2, \ldots, K, t=1, 2, \ldots, T \end{cases} \quad (12)$$

where $\lambda^{(m+1)}$, $\underline{\omega}^{(m+1)}$, $\overline{\omega}^{(m+1)}$ represent correction Lagrange multiplier vectors at a $(m+1)^{th}$ iteration;

obtaining an optimal solution $P_i^{(m+1)}$ of formula (4) by traversing all generators;

obtaining $q_i(\lambda^{(m+1)}, \underline{\omega}^{(m+1)}, \overline{\omega}^{(m+1)})$ according to the optimal solution $P_i^{(m+1)}$;

obtaining a Lagrange dual function $q(\lambda^{(m+1)}, \underline{\omega}^{(m+1)}, \overline{\omega}^{(m+1)})$ according to formula (3);

obtaining subgradients of the Lagrange multipliers at the $(m+1)^{th}$ iteration according to formula (13), $$\begin{cases} g_{\lambda_t}^{(m+1)} = D_t - \sum_{i=1}^{N_g} p_{i,t}^{(m+1)}, & \forall t=1, 2, \ldots, T \\ g_{\underline{\omega}_{k,t}}^{(m+1)} = \underline{L}_{k,t} - \sum_{i=1}^{N_g} G_{k,i} \cdot p_{i,t}^{(m+1)}, & \forall k=1, 2, \ldots, K, t=1, 2, \ldots, T \\ g_{\overline{\omega}_{k,t}}^{(m+1)} = \sum_{i=1}^{N_g} G_{k,i} \cdot p_{i,t}^{(m+1)} - \overline{L}_{k,t}, & \forall k=1, 2, \ldots, K, t=1, 2, \ldots, T \end{cases} \quad (13)$$

where m+1 represents the $(m+1)^{th}$ iteration, $g_{\lambda_t}^{m+1}$ represents a subgradient of the Lagrange multiplier $\lambda_t$ in the $t^{th}$ dispatching interval at the $(m+1)^{th}$ iteration, $g_{\underline{\omega}_{k,t}}^{m+1}$ represents a subgradient of the Lagrange multiplier $\underline{\omega}_{k,t}$ of the $k^{th}$ transmission interface in the $t^{th}$ dispatching interval at the $(m+1)^{th}$ iteration, $g_{\overline{\omega}_{K,T}}^{m+1}$ represents a subgradient of the Lagrange multiplier $\overline{\omega}_{k,t}$ of the $k^{th}$ transmission interface in the $t^{th}$ dispatching interval at the $(m+1)^{th}$ iteration;

updating a first incremental vector and a second incremental vector of the Lagrange multiplier vectors according to formula (14), $$\begin{cases} u^{(m)} = [\lambda^{(m+1)} - \lambda^{(m)}, \underline{\omega}^{(m+1)} - \underline{\omega}^{(m)}, \overline{\omega}^{(m+1)} - \overline{\omega}^{(m)}]^T \\ v^{(m)} = [g_\lambda^{(m+1)} - g_\lambda^{(m)}, g_{\underline{\omega}}^{(m+1)} - g_{\underline{\omega}}^{(m)}, g_{\overline{\omega}}^{(m+1)} - g_{\overline{\omega}}^{(m)}]^T \end{cases} \quad (14)$$

where $u^{(m)}$ represents the first incremental vector, $v^{(m)}$ represents the second incremental vector;

obtaining the approximate matrix according to the first incremental vector and the second incremental vector according to formula (15), $$B^{(m+1)} = B^{(m)} + \left(1 + \frac{v^{(m)T} B^{(m)} v^{(m)T}}{u^{(m)T} v^{(m)}}\right) \frac{u^{(m)} u^{(m)T}}{u^{(m)T} v^{(m)}} - \frac{u^{(m)} v^{(m)T} B^{(m)} + B^{(m)} v^{(m)} u^{(m)T}}{u^{(m)T} v^{(m)}}. \quad (15)$$

The method for identifying the feasibility of the transmission interface constraint in the online rolling dispatching according to an embodiment of the present disclosure overcomes deficiencies of being unable to identify and deal with the infeasible transmission interface constraints in the online rolling dispatching in the prior art, avoids being unable to provide the generation plan due to the infeasible transmission interface constraints in the online rolling dispatching, and improves the robustness and the practicality of the online rolling dispatching.

The method for identifying the feasibility of the transmission interface constraint in the online rolling dispatching according to an embodiment of the present disclosure uses the criterion based on the weak duality theorem to identify the infeasible transmission interface constraints, which can quickly and accurately identify the infeasible transmission interface constraints only with a very small amount of computations. Therefore, the dispatching period in the power system is reduced.

The method for identifying the feasibility of the transmission interface constraint in the online rolling dispatching according to an embodiment of the present disclosure is easily integrated into the existing online rolling dispatching based on the Lagrangian relaxation dual problem without adjusting the framework of the method, which reduces the operating cost.

According to a second aspect of the present disclosure, a device for identifying a feasibility of a transmission interface constraint in an online rolling dispatching is provided. The device comprises: a first establishing module, configured for establishing an online rolling dispatching model including a plurality of transmission interface constraints; a second establishing module, configured for establishing a Lagrangian relaxation dual problem of the online rolling dispatching model; a identifying module, configured for identifying a plurality of feasibilities of the plurality of transmission interface constraints by solving the Lagrangian relaxation dual problem.

In some embodiments, the first establishing module is further configured for:

obtaining a dispatching period and a dispatching interval;

obtaining a number of dispatching intervals according to the dispatching period and the dispatching interval;

obtaining a plurality of quadratic coefficients, a plurality of linear coefficients and a plurality of constant coefficients of generating costs of a plurality of generators;

obtaining a plurality of generation shift distribution factors of the plurality of generators to corresponding transmission interfaces in the plurality of transmission interfaces;

establishing the online rolling dispatching model according to the number of the dispatching intervals, the plurality of quadratic coefficients, the plurality of linear coefficients, the plurality of constant coefficients and the plurality of generation shift distribution factors, wherein the online rolling dispatching model is expressed according to formula (1), $$\min_{p} C(p) = \sum_{t=1}^{T} \sum_{i=1}^{N_g} (a_{i,t} \cdot p_{i,t}^2 + b_{i,t} \cdot p_{i,t} + c_{i,t}) \quad (1)$$

subject to, $$\sum_{i=1}^{N_g} p_{i,t} = D_t, \forall t = 1, 2, \ldots, T \quad (a)$$

$$\underline{L}_{k,t} \le \sum_{i=1}^{N_g} G_{k,i} \cdot p_{i,t} \le \overline{L}_{k,t}, \forall k = 1, 2, \ldots, K, t = 1, 2, \ldots, T \quad (b)$$

$$H_i(p_i) \le 0, \forall i = 1, 2, \ldots, N_g \quad (c)$$

where t represents a $t^{th}$ dispatching interval, T represents the number of the dispatching intervals, i represents an $i^{th}$ generator, $N_g$ represents a number of the generators, K represents a number of the transmission interfaces corresponding to the $i^{th}$ generator, k represents a $k^{th}$ transmission interface corresponding to the $i^{th}$ generator, P represents a first decision vector, in which $p=[p_1, p_2, \ldots, p_i, \ldots, p_{N_g}]$, $p_i=[p_{i,1}, p_{i,2}, \ldots, p_{i,t}, \ldots, p_{i,T}]$ represents an active power vector of the $i^{th}$ generator, $a_{i,t}$, $b_{i,t}$ and $c_{i,t}$ represent a quadratic coefficient, a linear coefficient and a constant coefficient of the $i^{th}$ generator in the $t^{th}$ dispatching interval respectively; formula (1)(a) represents a plurality of minimum generating cost constraints, where $p_{i,t}$ represents an active power of the $i^{th}$ generator in the $t^{th}$ dispatching interval, $D_t$ represents a forecasted load value in the $t^{th}$ dispatching interval; formula (1)(b) represents the plurality of transmission interface constraints, where $\underline{L}_{k,t}$ represents a lower limit of an active power flow of the $k^{th}$ transmission interface in the $t^{th}$ dispatching interval, $\overline{L}_{k,t}$ represents an upper limit of the active power flow of the $k^{th}$ transmission interface in the $t^{th}$ dispatching interval, $G_{k,t}$ represents an generation shift distribution factor of the $i^{th}$ generator to the $k^{th}$ transmission interface; formula (1)(c) represents a plurality of physical constraints.

In some embodiments, the Lagrangian relaxation dual problem is expressed according to formula (2), $$\max_{\lambda, \underline{\omega}, \overline{\omega}} q(\lambda, \underline{\omega}, \overline{\omega}) \quad (2)$$

subject to, $$\underline{\omega}, \overline{\omega} \ge 0$$

where $q(\lambda, \underline{\omega}, \overline{\omega})$ represents a Lagrange dual function in the Lagrangian relaxation dual problem, $\lambda$, $\overline{\omega}$ and $\underline{\omega}$ represent Lagrange multiplier vectors. $\lambda=[\lambda_1, \lambda_2, \ldots, \lambda_T]$, $\underline{\omega}=[\underline{\omega}_{1,1}, \underline{\omega}_{1,2}, \ldots, \underline{\omega}_{1,T}, \ldots, \underline{\omega}_{K,1}, \underline{\omega}_{K,2}, \ldots, \underline{\omega}_{K,T}]$, $\overline{\omega}=[\overline{\omega}_{1,1}, \overline{\omega}_{1,2}, \ldots, \overline{\omega}_{1,T}, \ldots, \overline{\omega}_{K,1}, \overline{\omega}_{K,2}, \ldots, \overline{\omega}_{K,T}]$, in which the Lagrange dual function is expressed according to formula (3), $$q(\lambda, \underline{\omega}, \overline{\omega}) = \sum_{i=1}^{N_g} q_i(\lambda, \underline{\omega}, \overline{\omega}) + K(\lambda, \underline{\omega}, \overline{\omega}) \quad (3)$$

where $q_i(\lambda, \underline{\omega}, \overline{\omega})$ represents a child Lagrange dual function corresponding to the $i^{th}$ generator, in which the child Lagrange dual function is expressed according to formula (4), $$q_i(\lambda, \underline{\omega}, \overline{\omega}) = \min_{p_i} \{L_i(p_i, \lambda, \underline{\omega}, \overline{\omega}) \mid p_i \text{ is subject to } H_i(p_i) \le 0\} \quad (4)$$

where $L_i(p_i, \lambda, \underline{\omega}, \overline{\omega})$ represents a child Lagrange function corresponding to the $i^{th}$ generator, in which the child Lagrange function is expressed according to formula (5), $$L_i(p_i, \lambda, \underline{\omega}, \overline{\omega}) = \sum_{t=1}^{T} \left\{ a_{i,t} \cdot p_{i,t}^2 + \left[ b_{i,t} - \lambda_t + \sum_{k=1}^{K} G_{k,i} \cdot (\overline{\omega}_{k,t} - \underline{\omega}_{k,t}) \right] \right\} \quad (5)$$

where $K(\lambda, \underline{\omega}, \overline{\omega})$ is expressed according to formula (6), $$K(\lambda, \underline{\omega}, \overline{\omega}) = \sum_{t=1}^{T} \left[ \lambda_t \cdot D_t + \sum_{k=1}^{K} (\underline{\omega}_{k,t} \cdot \underline{L}_{k,t} - \overline{\omega}_{k,t} \cdot \overline{L}_{k,t}) \right] \quad (6)$$

In some embodiments, the identifying module is further configured for:

S31, initializing an iteration number m, the Lagrange multiplier vectors, an approximate matrix, an existing flag of an infeasible transmission interface constraint and a plurality of feasible flags of the plurality of transmission interface constraints;

S32, obtaining an infinite norm of subgradients of the Lagrange multipliers at a $m^{th}$ iteration;

S33, judging whether the infinite norm is converged;

S34, if yes, outputting a plurality of pieces of feasibility information of the plurality of transmission interface constraints according to the existing flag and the plurality of feasible flags;

S35, if no, judging whether there is an infeasible transmission interface constraint;
  S351, if yes, updating the existing flag and the plurality of feasible flags, and identifying the infeasible transmission interface constraint and repeating step S31;
  S352, if no, updating the Lagrange multiplier vectors and the approximate matrix, and setting m=m+1;
S36, judging whether m is greater than a preset value;
S37, if no, repeating step S33;
S38, if yes, outputting a plurality of pieces of feasibility information of the plurality of transmission interface constraints according to the existing flag and the plurality of feasible flags.

In some embodiments, the identifying module obtains the infinite norm of subgradients of the Lagrange multipliers at the $m^{th}$ iteration by:
  obtaining the subgradients of the Lagrange multipliers at the $m^{th}$ iteration according to formula (7), $$\begin{cases} g_{\lambda_t}^m = D - \sum_{i=1}^{N_g} p_{i,t}^m, & \forall t = 1, 2, \ldots, T \\ g_{\underline{\omega}_{k,t}}^m = \underline{L}_{k,i} - \sum_{i=1}^{N_g} G_{k,i} \cdot p_{i,t}^m, & \forall k = 1, 2, \ldots, K, t = 1, 2, \ldots, T \\ g_{\overline{\omega}_{k,t}}^m = \sum_{i=1}^{N_g} G_{k,i} \cdot p_{i,t}^m - \overline{L}_{k,t}, & \forall k = 1, 2, \ldots, K, t = 1, 2, \ldots, T \end{cases} \quad (7)$$

where m represents the $m^{th}$ iteration, $\lambda_t$ represents a Lagrange multiplier in the $t^{th}$ dispatching interval, $\underline{\omega}_{k,t}$ represents a Lagrange multiplier of the $k^{th}$ transmission interface in the $t^{th}$ dispatching interval, $\overline{\omega}_{k,t}$ represents a Lagrange multiplier of the $k^{th}$ transmission interface in the $t^{th}$ dispatching interval, $g_{\lambda_t}^m$ represents a subgradient of the Lagrange multiplier $\lambda_t$ in the $t^{th}$ dispatching interval at the $m^{th}$ iteration, $g_{\underline{\omega}_{k,t}}^m$ represents a subgradient of the Lagrange multiplier $\underline{\omega}_{k,t}$ of the $k^{th}$ transmission interface in the $t^{th}$ dispatching interval at the $m^{th}$ iteration, $g_{\overline{\omega}_{K,T}}^m$ represents a subgradient of the Lagrange multiplier $\overline{\omega}_{k,t}$ of the $k^{th}$ transmission interface in the $t^{th}$ dispatching interval at the $m^{th}$ iteration;
  obtaining the infinite norm of the subgradients according to formula (8), $$g_\infty^{(m)} = \max\{|g_{\lambda_t}^{(m)}|, |g_{\underline{\omega}_{k,t}}^{(m)}|, |g_{\overline{\omega}_{k,i}}^{(m)}| \,|\, \forall t = 1,2,\ldots,T, k=1,2,\ldots,K\} \quad (8)$$

In some embodiments, the identifying module judges whether there is an infeasible transmission interface constraint by:
  obtaining an upper limit of the Lagrange dual function according to formula (9), $$\overline{C} = \sum_{t=1}^{T} \sum_{i=1}^{N_g} [a_{i,t} \cdot (P_{i,t}^{max})^2 + b_{i,t} \cdot P_{i,t}^{max} + c_{i,t}], \quad (9)$$

where $\overline{C}$ represents the upper limit of the Lagrange dual function, $P_{i,t}^{max}$ represents a maximum active power of the $i^{th}$ generator in the $t^{th}$ dispatching interval;
  obtaining an optimal solution $P_i^m$ of formula (4) by traversing all generators;
  obtaining $q_i(\lambda^m, \underline{\omega}^m, \overline{\omega}^m)$ according to the optimal solution $P_i^m$;

judging whether $q_i(\lambda^m, \underline{\omega}^m, \overline{\omega}^m)$ is greater than the upper limit of the Lagrange dual function.

In some embodiments, the identifying module updates the existing flag and the plurality of feasible flags, and identifies the infeasible transmission interface constraint and repeats step S31 by:
  S3511, setting flag=0, where flag represents the existing flag;
  S3512, setting k=1, where k represents a number of cycles;
  S3513, obtaining an intermediate parameter $q'_k = q(\lambda^{(m)}, E_k(\underline{\omega}^{(m)}), E_k(\overline{\omega}^{(m)}))$ according to formula (3) and judging whether $q'_k = q(\lambda^{(m)}, E_k(\underline{\omega}^{(m)}), E_k(\overline{\omega}^{(m)}))$ is greater than the upper limit of the Lagrange dual function, wherein $E_k(\underline{\omega}^{(m)})$ and $E_k(\overline{\omega}^{(m)})$ are expressed according to formula (10), $$\begin{cases} E_k(\underline{\omega}^{(m)}) = [0, 0, \ldots, 0, \underline{\omega}_{k,1}^{(m)}, \underline{\omega}_{k,2}^{(m)}, \ldots, \underline{\omega}_{k,T}^{(m)}, 0, \ldots, 0] \\ E_k(\overline{\omega}^{(m)}) = [0, 0, \ldots, 0, \overline{\omega}_{k,1}^{(m)}, \overline{\omega}_{k,2}^{(m)}, \ldots, \overline{\omega}_{k,T}^{(m)}, 0, \ldots, 0] \end{cases} ; \quad (10)$$

S3514, if yes, setting $f_k=1$ and flag=1, where $f_k$ represents the feasible flag of the $k^{th}$ transmission interface constraint, and going to step S3516;
  S3515, if no, setting k=k+1 and flag=0, and judging whether k is greater than K;
    S35151, if no, repeating step S3513;
    S35152, if yes, going to step S3516;
  S3516, judging whether flag is 1;
  S3517, if no, going to step S352;
  S3518, if yes, traversing $f_k$, where k=1, 2, ..., K, if $f_k=1$, setting the lower limit of the active power flow of the $k^{th}$ transmission interface constraint in the $t^{th}$ dispatching interval $\underline{L}_{k,t}=-\infty$, $\forall t=1, 2, \ldots, T$ and the upper limit of the active power flow of the $k^{th}$ transmission interface constraint in the $t^{th}$ dispatching interval $\overline{L}_{k,t}=+\infty$, $\forall t=1, 2, \ldots, T$, and repeating step S31; if $f_k=0$, maintaining the lower limit and the upper limit of the active power flow of the $k^{th}$ transmission interface constraint in the $t^{th}$ dispatching interval constant, and repeating step S31.

In some embodiments, the identifying module updates the Lagrange multiplier vectors and the approximate matrix, and sets m=m+1 by:
  obtaining correction directions of the Lagrange multiplier vectors according to formula (11), $$[d_\lambda^{(m)}, d_{\underline{\omega}}^{(m)}, d_{\overline{\omega}}^{(m)}] = B^{(m)} \cdot [g_\lambda^{(m)}, g_{\underline{\omega}}^{(m)}, g_{\overline{\omega}}^{(m)}] \quad (11)$$

where $d_\lambda^{(m)}$, $d_{\underline{\omega}}^{(m)}$ and $d_{\overline{\omega}}^{(m)}$ represent the correction directions, in which $d_\lambda^{(m)} = [d_{\lambda_1}^{(m)}, d_{\lambda_2}^{(m)}, \ldots, d_{\lambda_T}^{(m)}]$, $d_{\underline{\omega}}^{(m)} = [d_{\underline{\omega}_{1,1}}^{(m)}, d_{\underline{\omega}_{1,2}}^{(m)}, \ldots, d_{\underline{\omega}_{1,T}}^{(m)}, \ldots, d_{\underline{\omega}_{K,T}}^{(m)}]$ and $d_{\overline{\omega}}^{(m)} = [d_{\overline{\omega}_{1,1}}^{(m)}, d_{\overline{\omega}_{1,2}}^{(m)}, \ldots, d_{\overline{\omega}_{1,T}}^{(m)}, \ldots, d_{\overline{\omega}_{K,T}}^{(m)}]$, $B^{(m)}$ represents the approximate matrix;
  updating the Lagrange multiplier vectors according to formula (12), $$\begin{cases} \lambda_t^{(m+1)} \lambda_t^{(m)} + \alpha \cdot d_{\lambda_t}^{(m)}, & \forall t = 1, 2, \ldots, T \\ \underline{\omega}_{k,t}^{(m+1)} = \max\{\underline{\omega}_{k,t}^{(m)} + \alpha \cdot d_{\underline{\omega}_{k,t}}^{(m)}, 0\}, & \forall k = 1, 2, \ldots, K, t = 1, 2, \ldots, T \\ \overline{\omega}_{k,t}^{(m+1)} = \max\{\overline{\omega}_{k,t}^{(m)} + \alpha \cdot d_{\overline{\omega}_{k,t}}^{(m)}, 0\}, & \forall k = 1, 2, \ldots, K, t = 1, 2, \ldots, T \end{cases} \quad (12)$$

where $\lambda^{(m+1)}$, $\underline{\omega}^{(m+1)}$, $\overline{\omega}^{(m+1)}$ represent correction Lagrange multiplier vectors at a $(m+1)^{th}$ iteration;
  obtaining an optimal solution $P_i^{(m+1)}$ of formula (4) by traversing all generators;

obtaining $q_i(\lambda^{(m+1)}, \underline{\omega}^{(m+1)}, \overline{\omega}^{(m+1)})$ according to the optimal solution $P_i^{(m+1)}$;

obtaining a Lagrange dual function $q(\lambda^{(m+1)}, \underline{\omega}^{(m+1)}, \overline{\omega}^{(m+1)})$ according to formula (3);

obtaining subgradients of the Lagrange multipliers at the $(m+1)^{th}$ iteration according to formula (13), $$\begin{cases} g_{\lambda_t}^{(m+1)} = D_t - \sum_{i=1}^{N_g} p_{i,t}^{(m+1)}, & \forall t = 1, 2, \ldots, T \\ g_{\underline{\omega}_{k,t}}^{(m+1)} = \underline{L}_{k,t} - \sum_{i=1}^{N_g} G_{k,i} \cdot p_{i,t}^{(m+1)}, & \forall k = 1, 2, \ldots, K, t = 1, 2, \ldots, T \\ g_{\overline{\omega}_{k,t}}^{(m+1)} = \sum_{i=1}^{N_g} G_{k,i} \cdot p_{i,t}^{(m+1)} - \overline{L}_{k,t}, & \forall k = 1, 2, \ldots, K, t = 1, 2, \ldots, T \end{cases} \quad (13)$$

where m+1 represents the $(m+1)^{th}$ iteration, $g_{\lambda_t}^{m+1}$ represents a subgradient of the Lagrange multiplier $\lambda_t$ in the $t^{th}$ dispatching interval at the $(m+1)^{th}$ iteration, $g_{\underline{\omega}_{k,t}}^{m+1}$ represents a subgradient of the Lagrange multiplier $\underline{\omega}_{k,t}$ of the $k^{th}$ transmission interface in the $t^{th}$ dispatching interval at the $(m+1)^{th}$ iteration, $g_{\overline{\omega}_{K,T}}^{m+1}$ represents a subgradient of the Lagrange multiplier $\overline{\omega}_{k,t}$ of the $k^{th}$ transmission interface in the $t^{th}$ dispatching interval at the $(m+1)^{th}$ iteration;

updating a first incremental vector and a second incremental vector of the Lagrange multiplier vectors according to formula (14), $$\begin{cases} u^{(m)} = [\lambda^{(m+1)} - \lambda^{(m)}, \underline{\omega}^{(m+1)} - \underline{\omega}^{(m)}, \overline{\omega}^{(m+1)} - \overline{\omega}^{(m)}]^T \\ v^{(m)} = [g_\lambda^{(m+1)} - g_\lambda^{(m)}, g_{\underline{\omega}}^{(m+1)} - g_{\underline{\omega}}^{(m)}, g_{\overline{\omega}}^{(m+1)} - g_{\overline{\omega}}^{(m)}]^T \end{cases} \quad (14)$$

where $u^{(m)}$ represents the first incremental vector, $v^{(m)}$ represents the second incremental vector;

obtaining the approximate matrix according to the first incremental vector and the second incremental vector according to formula (15), $$B^{(m+1)} = B^{(m)} + \left(1 + \frac{v^{(m)T} B^{(m)} v^{(m)T}}{u^{(m)T} v^{(m)}}\right) \frac{u^{(m)} u^{(m)T}}{u^{(m)T} v^{(m)}} - \frac{u^{(m)} v^{(m)T} B^{(m)} + B^{(m)} v^{(m)} u^{(m)T}}{u^{(m)T} v^{(m)}}. \quad (15)$$

The device for identifying the feasibility of the transmission interface constraint in the online rolling dispatching according to an embodiment of the present disclosure overcomes deficiencies of being unable to identify and deal with the infeasible transmission interface constraints in the online rolling dispatching in the prior art, avoids being unable to provide the generation plan due to the infeasible transmission interface constraints in the online rolling dispatching, and improves the robustness and the practicality of the online rolling dispatching.

The device for identifying the feasibility of the transmission interface constraint in the online rolling dispatching according to an embodiment of the present disclosure uses the criterion based on the weak duality theorem to identify the infeasible transmission interface constraints, which can quickly and accurately identify the infeasible transmission interface constraints only with a very small amount of computations. Therefore, the dispatching period in the power system is reduced.

The device for identifying the feasibility of the transmission interface constraint in the online rolling dispatching according to an embodiment of the present disclosure is easily integrated into the existing online rolling dispatching based on the Lagrangian relaxation dual problem without adjusting the framework of the method, which reduces the operating cost.

According to a third aspect of the present disclosure, a computer readable storage medium is provided. The computer readable storage medium comprises a computer program for executing the method for identifying the feasibility of the transmission interface constraint in the online rolling dispatching according to the first aspect of the present disclosure when running on a computer.

The above summary of the present disclosure is not intended to describe each disclosed embodiment or every implementation of the present disclosure. The Figures and the detailed descriptions which follow more particularly exemplify illustrative embodiments.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
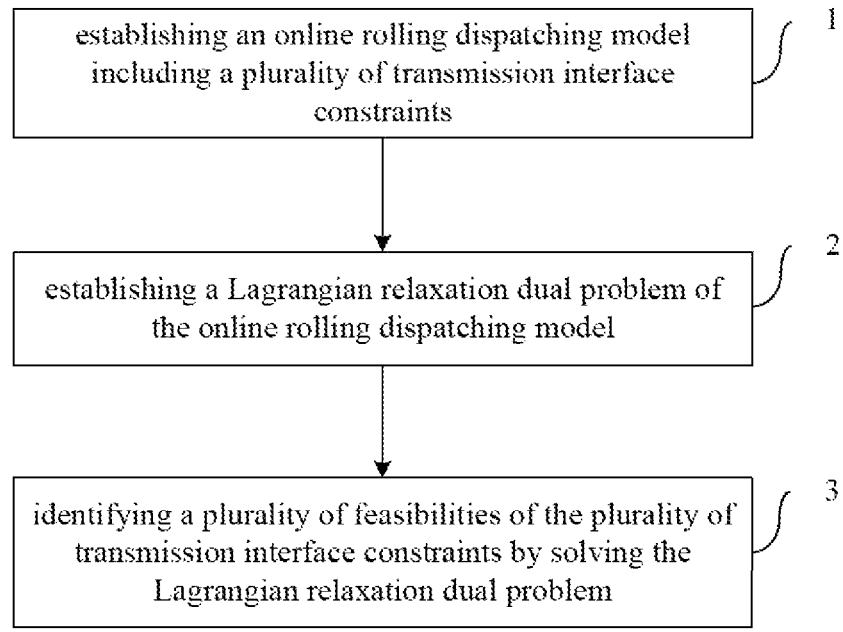
FIG. 1 is a flow chart of a method for identifying a feasibility of a transmission interface constraint in an online rolling dispatching according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In addition, terms such as "first" and "second" are used herein for purposes of description and are not intended to indicate or imply relative importance or significance. Thus, the feature defined with "first" and "second" may comprise one or more this feature. In the description of the present disclosure, "a plurality of" means two or more than two, unless specified otherwise.

In the description of the present disclosure, it should be understood that, unless specified or limited otherwise, the terms "mounted," "connected," and "coupled" and variations thereof are used broadly and encompass such as mechanical or electrical mountings, connections and couplings, also can be inner mountings, connections and couplings of two components, and further can be direct and indirect mountings, connections, and couplings, which can be understood by those skilled in the art according to the detail embodiment of the present disclosure.

In the following, a method and a device for identifying a feasibility of a transmission interface constraint in an online rolling dispatching according to embodiments of the present disclosure will be described in detail with reference to the drawings.

FIG. 1 is a flow chart of a method for identifying a feasibility of a transmission interface constraint in an online rolling dispatching according to an embodiment of the present disclosure.

As shown in FIG. 1, the method comprises the following steps.

In step 1, an online rolling dispatching model including a plurality of transmission interface constraints is established.

In one embodiment, step 1 comprises the following steps.

In step 11, a dispatching period and a dispatching interval are obtained.

For example, the dispatching period is set within the range of 1 to 4 hours, and the dispatching interval between two neighboring dispatching instants is set within the range of 5 to 15 minutes.

In step 12, a number of dispatching intervals is obtained according to the dispatching period and the dispatching interval.

For example, the number of the dispatching intervals is obtained according to formula (16), $$T = \frac{T_{span}}{T_{space}}, \tag{16}$$

where T represents the number of the dispatching intervals, $T_{span}$ represents the dispatching period, and $T_{space}$ represents the dispatching interval.

In step 13, a plurality of quadratic coefficients, a plurality of linear coefficients and a plurality of constant coefficients of generating costs of a plurality of generators are obtained.

For example, the plurality of quadratic coefficients, the plurality of linear coefficients and the plurality of constant coefficients are obtained from coefficients of quadratic terms, linear terms and constant terms of Taylor expansion of the generating costs respectively. The quadratic coefficient of generating costs of all generators is $a=\{a_{i,t}|i=1, 2, \ldots, N_g, t=1, 2, \ldots, T\}$, the linear coefficient of generating costs of all generators is $b=\{b_{i,t}|i=1, 2, \ldots, N_g, t=1, 2, \ldots, T\}$, and the constant coefficient of generating costs of all generators is $c=\{c_{i,t}|i=1, 2, \ldots, N_g, t=1, 2, \ldots, T\}$, where $a_{i,t}$, $b_{i,t}$ and $c_{i,t}$ represent a quadratic coefficient, a linear coefficient and a constant coefficient of the $i^{th}$ generator in the $t^{th}$ dispatching interval respectively.

In step 14, a plurality of generation shift distribution factors of the plurality of generators to corresponding transmission interfaces in the plurality of transmission interfaces are obtained.

In one embodiment, step 14 comprises the following steps.

In step 141, a nodal susceptance matrix is obtained by means of a plurality of branch parameters which are reciprocals of a plurality of branch reactances.

A nodal reactance matrix is obtained according to the nodal susceptance matrix, in which $$X = B_0^{-1},$$

where X represents the nodal reactance matrix and $B_0$ represents the nodal susceptance matrix.

In step 142, k=1 is set.

In step 143, i=1 is set.

In step 144, a plurality of transmission lines of the $k^{th}$ transmission interface are traversed to obtain each generation shift distribution factor of the $i^{th}$ generator to each transmission line according to formula (17), $$\gamma_{l-i} = \frac{X_{ng(i),nbi(l)} - X_{ng(i),nbj(l)}}{x_l} \tag{17}$$

where l represents an $l^{th}$ transmission line, $l \in IL_k$, $IL_k$ represents a set of the transmission lines of the $k^{th}$ transmission interface, ng(i) represents a marker of a node connected to the $i^{th}$ generator, nbi(l) represents a beginning point of the $l^{th}$ transmission line, nbj(l) represents an ending point of the $l^{th}$ transmission line, $X_{ng(i),nbi(l)}$ represents an element in column ng(i) in row nbi(l) in the nodal reactance matrix, $X_{ng(i),nbj(l)}$ represents an element in column ng(i) in row nbj(l) in the nodal reactance matrix, $x_l$ represents a reactance of the $l^{th}$ transmission line.

In step 145, the generation shift distribution factor of the $i^{th}$ generator to the $k^{th}$ transmission interface is obtained according to formula (18), $$G_{k-i} = \sum_{l \in LL_s} \gamma_{l-i}. \tag{18}$$

In step 146, i=i+1 is set.

Then, whether i is greater than a total number $N_g$ of the generators is judged.

In step 147, if $i \leq N_g$, step 144 is repeated.

In step 148, if $i > N_g$, k=k+1 is set, and then whether k is greater than a number K of the transmission interfaces corresponding to the $i^{th}$ generator is judged.

In step 149, if $k \leq K$, step 143 is repeated; and if k>K, step 14 is ended.

In step 15, the online rolling dispatching model is established according to the number of the dispatching intervals, the plurality of quadratic coefficients, the plurality of linear coefficients, the plurality of constant coefficients and the plurality of generation shift distribution factors, in which the online rolling dispatching model is expressed according to formula (1), $$\min_p C(p) = \sum_{t=1}^{T} \sum_{i=1}^{N_g} (a_{i,t} \cdot p_{i,t}^2 + b_{i,t} \cdot p_{i,t} + c_{i,t}) \tag{1}$$

subject to, $$\sum_{i=1}^{N_g} p_{i,t} = D_t, \forall\, t = 1, 2, \ldots, T \tag{a}$$

$$\underline{L}_{k,t} \leq \sum_{i=1}^{N_g} G_{k,i} \cdot p_{i,t} \leq \overline{L}_{k,t}, \forall\, k = 1, 2, \ldots, K, t = 1, 2, \ldots, T \tag{b}$$

$$H_i(p_i) \leq 0, \forall\, i = 1, 2, \ldots, N_g \tag{c}$$

where t represents a $t^{th}$ dispatching interval, T represents the number of the dispatching intervals, i represents an $i^{th}$ generator, $N_g$ represents a number of the generators, K represents a number of the transmission interfaces corresponding to the $i^{th}$ generator, k represents a $k^{th}$ transmission interface corresponding to the $i^{th}$ generator, p represents a first decision vector, in which $p=[p_1, p_2, \ldots, p_i, \ldots, p_{N_g}]$, $p_i=[p_{i,1}, p_{i,2}, \ldots, p_{i,t}, \ldots, p_{i,T}]$ represents an active power vector of the $i^{th}$ generator, $a_{i,t}$, $b_{i,t}$ and $c_{i,t}$ represent a quadratic coefficient, a linear coefficient and a constant coefficient of the $i^{th}$ generator in the $t^{th}$ dispatching interval respectively; formula (1)(a) represents a plurality of minimum generating cost constraints, where $p_{i,t}$ represents an active power of the $i^{th}$ generator in the $t^{th}$ dispatching interval, $D_t$ represents a forecasted load value in the $t^{th}$ dispatching interval; formula (1)(b) represents the plurality of transmission interface constraints, where $\underline{L}_{k,t}$ represents a lower limit of an active power flow of the $k^{th}$ transmission interface in the $t^{th}$ dispatching interval, $\overline{L}_{k,t}$ represents an upper limit of the active power flow of the $k^{th}$ transmission interface in the $t^{th}$ dispatching interval, $G_{k,i}$ represents an generation shift distribution factor of the $i^{th}$ generator to the $k^{th}$ transmission interface; formula (1)(c) represents a plurality of physical constraints.

In one embodiment, the plurality of physical constraints contain a plurality of active power limit constraints and a plurality of active power ramp rate limit constraints.

The plurality of active power limit constraints are expressed according to formula (19)

$$\begin{cases} -p_{i,t} \leq -P_{i,t}^{min} \\ p_{i,t} \leq P_{i,t}^{max} \end{cases}, \forall t=1, 2, \ldots, T \quad (19)$$

where $P_{i,t}^{min}$ represents a lower limit of the active power of the $i^{th}$ generator in the $t^{th}$ dispatching interval and $P_{i,t}^{max}$ represents an upper limit of the active power of the $i^{th}$ generator in the $t^{th}$ dispatching interval.

The plurality of active power ramp rate limit constraints are expressed according to formula (20)

$$\begin{cases} -p_{i,t} + p_{i,t-1} - RD_{i,t-1} \leq 0 \\ p_{i,t} - p_{i,t-1} - RU_{i,t-1} \leq 0 \end{cases}, \forall t=1, 2, \ldots, T \quad (20)$$

where $RD_{i,t}$ represents a maximum of down-regulation of the $i^{th}$ generator in the $t^{th}$ dispatching interval and $RU_{i,t}$ represents a maximum of up-regulation of the $i^{th}$ generator in the $t^{th}$ dispatching interval.

Specifically, the transmission interface refers to a set of transmission lines. As expressed according to formula (1)(b), the plurality of transmission interface constraints mean that the limits of the active power flow cannot exceed the specified limits. The infeasible transmission interface constraints refer to the following conditions: when the transmission interface constraints exist in the model expressed by formula (1), formula (1) is infeasible, but when the transmission interface constraints do not exist in the model expressed by formula (1), formula (1) is feasible.

In step 2, a Lagrangian relaxation dual problem of the online rolling dispatching model is established.

In one embodiment, the Lagrangian relaxation dual problem is expressed according to formula (2), $$\max_{\lambda, \underline{\omega}, \overline{\omega}} q(\lambda, \underline{\omega}, \overline{\omega}) \quad (2)$$

subject to, $\underline{\omega}, \overline{\omega} \geq 0$ where $q(\lambda, \underline{\omega}, \overline{\omega})$ represents a Lagrange dual function in the Lagrangian relaxation dual problem, $\lambda$, $\overline{\omega}$ and $\underline{\omega}$ a represent Lagrange multiplier vectors, $\lambda=[\lambda_1, \lambda_2, \ldots, \lambda_T]$, $\underline{\omega}=[\underline{\omega}_{1,1}, \underline{\omega}_{1,2}, \ldots, \underline{\omega}_{1,T}, \ldots, \underline{\omega}_{K,1}, \underline{\omega}_{K,2}, \ldots, \underline{\omega}_{K,T}]$, $\overline{\omega}=[\overline{\omega}_{1,1}, \overline{\omega}_{1,2}, \ldots, \overline{\omega}_{1,T}, \ldots, \overline{\omega}_{K,1}, \overline{\omega}_{K,2}, \ldots, \overline{\omega}_{K,T}]$, in which the Lagrange dual function is expressed according to formula (3), $$q(\lambda, \underline{\omega}, \overline{\omega}) = \sum_{i=1}^{N_g} q_i(\lambda, \underline{\omega}, \overline{\omega}) + K(\lambda, \underline{\omega}, \overline{\omega}) \quad (3)$$

where $q_i(\lambda, \underline{\omega}, \overline{\omega})$ represents a child Lagrange dual function corresponding to the $i^{th}$ generator, in which the child Lagrange dual function is expressed according to formula (4), $$q_i(\lambda, \underline{\omega}, \overline{\omega}) = \min_{p_i}\{L_i(p_i, \lambda, \underline{\omega}, \overline{\omega}) \mid p_i \text{ is subject to } H_i(p_i) \leq 0\} \quad (4)$$

where $L_i(p_i, \lambda, \underline{\omega}, \overline{\omega})$ represents a child Lagrange function corresponding to the $i^{th}$ generator, in which the child Lagrange function is expressed according to formula (5), $$L_i(p_i, \lambda, \underline{\omega}, \overline{\omega}) = \sum_{i=1}^{T}\left\{a_{i,t} \cdot p_{i,t}^2 + \left[b_{i,t} - \lambda_i + \sum_{k=1}^{K} G_{k,i} \cdot (\overline{\omega}_{k,t} - \underline{\omega}_{k,t})\right]\right\} \quad (5)$$

where $K(\lambda, \underline{\omega}, \overline{\omega})$ is expressed according to formula (6), $$K(\lambda, \underline{\omega}, \overline{\omega}) = \sum_{t=1}^{T}\left[\lambda_t \cdot D_t + \sum_{k=1}^{K}(\underline{\omega}_{k,t} \cdot \underline{L}_{k,t} - \overline{\omega}_{k,t} \cdot \overline{L}_{k,t})\right]. \quad (6)$$

In step 3, a plurality of feasibilities of the plurality of transmission interface constraints are identified by solving the Lagrangian relaxation dual problem.

In one embodiment, step 3 comprises the following steps.

In step 31, an iteration number m, the Lagrange multiplier vectors, an approximate matrix, an existing flag of an infeasible transmission interface constraint and a plurality of feasible flags of the plurality of transmission interface constraints are initialized.

For example, the iteration number m=0, the iteration convergence error criterion $\epsilon$=0.001, the maximum iteration number M=1000~10000, the correction step $\alpha$=0.8~0.9995, the feasible flags of the plurality of transmission interface constraints $f=[f_1, f_2, \ldots, f_K]=[0, 0, \ldots, 0]$, and the existing flag flag=0.

Also, the Lagrange multiplier vectors $\lambda^{(0)}$=0, $\underline{\omega}^{(0)}=\overline{\omega}^{(0)}$=0, the approximate matrix $B^{(0)}$ is established and the approximate matrix is a unit matrix which has the same number of columns as $[\lambda, \underline{\omega}, \overline{\omega}]$.

In step 32, an infinite norm of subgradients of the Lagrange multipliers at a $m^{th}$ iteration is obtained.

In one embodiment, step 32 comprises the following steps. The subgradients of the Lagrange multipliers are obtained at the $m^{th}$ iteration according to formula (7).

$$\begin{cases} g_{\lambda_t}^m = D - \sum_{i=1}^{N_g} p_{i,t}^m, & \forall t=1, 2, \ldots, T \end{cases} \quad (7)$$

-continued $$\begin{cases} g_{\underline{\omega}_{k,t}}^m = \underline{L}_{k,t} - \sum_{i=1}^{N_g} G_{k,i} \cdot p_{i,t}^m, \quad \forall\, k=1,2,\ldots,K, t=1,2,\ldots,T \\ g_{\overline{\omega}_{k,t}}^m = \sum_{i=1}^{N_g} G_{k,i} \cdot p_{i,t}^m - \overline{L}_{k,t}, \quad \forall\, k=1,2,\ldots,K, t=1,2,\ldots,T \end{cases}$$

where m represents the $m^{th}$ iteration. $\lambda_t$ represents a Lagrange multiplier in the $t^{th}$ dispatching interval, $\underline{\omega}_{k,t}$ represents a Lagrange multiplier of the $k^{th}$ transmission interface in the $t^{th}$ dispatching interval, $\overline{\omega}_{k,t}$ represents a Lagrange multiplier of the $k^{th}$ transmission interface in the $t^{th}$ dispatching interval, $g_{\lambda_t}^m$ represents a subgradient of the Lagrange multiplier $\Delta_t$ in the $t^{th}$ dispatching interval at the $m^{th}$ iteration, $g_{\underline{\omega}_{k,t}}^m$ represents a subgradient of the Lagrange multiplier $\underline{\omega}_{k,t}$ of the $k^{th}$ transmission interface in the $t^{th}$ dispatching interval at the $m^{th}$ iteration, $g_{\overline{\omega}_{K,T}}^m$ represents a subgradient of the Lagrange multiplier $\overline{\omega}_{k,t}$ of the $k^{th}$ transmission interface in the $t^{th}$ dispatching interval at the $m^{th}$ iteration. Then, the infinite norm of the subgradients is obtained according to formula (8), $$g_\infty^{(m)} = \max\{|g_{\lambda_t}^{(m)}|, |g_{\underline{\omega}_{k,t}}^{(m)}|, |g_{\overline{\omega}_{k,t}}^{(m)}|\,|\forall t=1,2,\ldots,T, k=1,2,\ldots,K\} \qquad (8)$$

In step 33, whether the infinite norm is converged is judged.

Specifically, if $g_\infty^{(m)} < \epsilon$, the infinite norm is converged, and if $g_\infty^{(m)} > \epsilon$, the infinite norm is not converged.

In step 34, if the infinite norm is converged, a plurality of pieces of feasibility information of the plurality of transmission interface constraints are outputted according to the existing flag and the plurality of feasible flags.

In step 35, if the infinite norm is not converged, whether there is an infeasible transmission interface constraint is judged.

In one embodiment, step 35 comprises the following steps.

Firstly, an upper limit of the Lagrange dual function is obtained according to formula (9), $$\overline{C} = \sum_{t=1}^{T}\sum_{i=1}^{N_g}[a_{i,t}\cdot(P_{i,t}^{max})^2 + b_{i,t}\cdot P_{i,t}^{max} + c_{i,t}], \qquad (9)$$

where $\overline{C}$ represents the upper limit of the Lagrange dual function, $P_{i,t}^{max}$ represents a maximum active power of the $i^{th}$ generator in the $t^{th}$ dispatching interval.

Secondly, an optimal solution $P_i^m$ of formula (4) is obtained by traversing all generators.

Thirdly, $q_i(\lambda^m,\underline{\omega}^m,\overline{\omega}^m)$ is obtained according to the optimal solution $P_i^m$. Then, whether $q_i(\lambda^m,\underline{\omega}^m,\overline{\omega}^m)$ is greater than the upper limit of the Lagrange dual function is judged.

In step 351, if there is an infeasible transmission interface constraint, the existing flag and the plurality of feasible flags are updated, and the infeasible transmission interface constraint is identified and step 31 is repeated.

In one embodiment, step 351 comprises the following steps.

In step 3511, flag=0 is set, where flag represents the existing flag.

In step 3512, k=1 is set, where k represents a number of cycles.

In step 3513, an intermediate parameter $q'_k = q(\lambda^{(m)}, E_k(\underline{\omega}^{(m)}), E_k(\overline{\omega}^{(m)}))$ is obtained according to formula (3), and then whether $q'_k = q(\lambda^{(m)}, E_k(\underline{\omega}^{(m)}), E_k(\overline{\omega}^{(m)}))$ is greater than the upper limit of the Lagrange dual function is judged, in which $E_k(\underline{\omega}^{(m)})$ and $E_k(\overline{\omega}^{(m)})$ are expressed according to formula (10), $$\begin{cases} E_k(\underline{\omega}^{(m)}) = [0, 0, \ldots, 0, \underline{\omega}_{k,1}^{(m)}, \underline{\omega}_{k,2}^{(m)}, \ldots, \underline{\omega}_{k,T}^{(m)}, 0, \ldots, 0] \\ E_k(\overline{\omega}^{(m)}) = [0, 0, \ldots, 0, \overline{\omega}_{k,1}^{(m)}, \overline{\omega}_{k,2}^{(m)}, \ldots, \overline{\omega}_{k,T}^{(m)}, 0, \ldots, 0] \end{cases} \qquad (10)$$

In step 3514, if yes, $f_k=1$ and flag=1 are set, where $f_k$ represents the feasible flag of the $k^{th}$ transmission interface constraint, and step 3516 is executed.

In step 3515, if no, k=k+1 and flag=0 are set, and then whether k is greater than K is judged.

In step 35151, if no, step 3513 is repeated.

In step 35152, if yes, step 3516 is executed.

In step 3516, whether flag is 1 is judged.

In step 3517, if no, step 352 is executed.

In step 3518, if yes, $f_k$ are traversed, where k=1, 2, . . . , K.

If $f_k=1$, the lower limit of the active power flow of the $k^{th}$ transmission interface constraint in the $t^{th}$ dispatching interval $\underline{L}_{k,t} = -\infty, \forall t=1,2,\ldots,T$ and the upper limit of the active power flow of the $k^{th}$ transmission interface constraint in the $t^{th}$ dispatching interval $\overline{L}_{k,t} = +\infty, \forall t=1,2,\ldots,T$, and step 31 is repeated.

If $f_k=0$, the lower limit and the upper limit of the active power flow of the $k^{th}$ transmission interface constraint in the $t^{th}$ dispatching interval is maintained constant, and step 31 is repeated.

In step 352, if there is no infeasible transmission interface constraint, the Lagrange multiplier vectors and the approximate matrix are updated and m=m+1 is set.

In one embodiment, step 352 comprises the following steps.

Firstly, correction directions of the Lagrange multiplier vectors are obtained according to formula (11), $$[d_\lambda^{(m)}, d_{\underline{\omega}}^{(m)}, d_{\overline{\omega}}^{(m)}] = B^{(m)} \cdot [g_\lambda^{(m)}, g_{\underline{\omega}}^{(m)}, g_{\overline{\omega}}^{(m)}] \qquad (11)$$

where $d_\lambda^{(m)}$, $d_{\underline{\omega}}^{(m)}$ and $d_{\overline{\omega}}^{(m)}$ represent the correction directions, in which $d_\lambda^{(m)} = [d_{\lambda_1}^{(m)}, d_{\lambda_2}^{(m)}, \ldots, d_{\lambda_T}^{(m)}]$, $d_{\underline{\omega}}^{(m)} = [d_{\underline{\omega}_{1,1}}^{(m)}, d_{\underline{\omega}_{1,2}}^{(m)}, \ldots, d_{\underline{\omega}_{1,T}}^{(m)}, \ldots, d_{\underline{\omega}_{K,T}}^{(m)}]$ and $d_{\overline{\omega}}^{(m)} = [d_{\overline{\omega}_{1,1}}^{(m)}, d_{\overline{\omega}_{1,2}}^{(m)}, \ldots, d_{\overline{\omega}_{1,T}}^{(m)}, \ldots, d_{\overline{\omega}_{K,T}}^{(m)}]$, $B^{(m)}$ represents the approximate matrix.

Secondly, the Lagrange multiplier vectors are updated according to formula (12).

$$\begin{cases} \lambda_t^{(m+1)} = \lambda_t^{(m)} + \alpha \cdot d_{\lambda_t}^{(m)}, \quad \forall\, t=1,2,\ldots,T \\ \underline{\omega}_{k,t}^{(m+1)} = \max\{\underline{\omega}_{k,t}^{(m)} + \alpha \cdot d_{\underline{\omega}_{k,t}}^{(m)}, 0\}, \quad \forall\, k=1,2,\ldots,K, t=1,2,\ldots,T \\ \overline{\omega}_{k,t}^{(m+1)} = \max\{\overline{\omega}_{k,t}^{(m)} + \alpha \cdot d_{\overline{\omega}_{k,t}}^{(m)}, 0\}, \quad \forall\, k=1,2,\ldots,K, t=1,2,\ldots,T \end{cases} \qquad (12)$$

where $\lambda^{(m+1)}$, $\underline{\omega}^{(m+1)}$, $\overline{\omega}^{(m+1)}$ represent correction Lagrange multiplier vectors at a $(m+1)^{th}$ iteration;

Thirdly, an optimal solution $P_i^{(m+1)}$ of formula (4) is obtained by traversing all generators.

Fourthly, $q_i(\lambda^{(m+1)}, \underline{\omega}^{(m+1)}, \overline{\omega}^{(m+1)})$ is obtained according to the optimal solution $P_i^{(m+1)}$.

Fifthly, a Lagrange dual function $q(\lambda^{(m+1)}, \underline{\omega}^{(m+1)}, \overline{\omega}^{(m+1)})$ is obtained according to formula (3).

Sixthly, subgradients of the Lagrange multipliers at the $(m+1)^{th}$ iteration are obtained according to formula (13), $$\begin{cases} g_{\lambda_t}^m = D_t - \sum_{i=1}^{N_g} p_{i,t}^{(m+1)}, & \forall t = 1, 2, \ldots, T \\ g_{\underline{\omega}_{k,t}}^{(m+1)} = \underline{L}_{k,t} - \sum_{i=1}^{N_g} G_{k,i} \cdot p_{i,t}^{(m+1)}, & \forall k = 1, 2, \ldots, K, t = 1, 2, \ldots, T \\ g_{\overline{\omega}_{k,t}}^{(m+1)} = \sum_{i=1}^{N_g} G_{k,i} \cdot p_{i,t}^{(m+1)} - \overline{L}_{k,t}, & \forall k = 1, 2, \ldots, K, t = 1, 2, \ldots, T \end{cases} \quad (13)$$

where m+1 represents the (m+1)$^{th}$ iteration, $g_{\lambda_t}^{m+1}$ represents a subgradient of the Lagrange multiplier $\lambda_t$ in the t$^{th}$ dispatching interval at the (m+1)$^{th}$ iteration, $g_{\underline{\omega}_{k,t}}^{m+1}$ represents a subgradient of the Lagrange multiplier $\underline{\omega}_{k,t}$ of the k$^{th}$ transmission interface in the t$^{th}$ dispatching interval at the (m+1)$^{th}$ iteration, $g_{\overline{\omega}_{k,t}}^{m+1}$ represents a subgradient of the Lagrange multiplier $\overline{\omega}_{k,t}$ of the k$^{th}$ transmission interface in the t$^{th}$ dispatching interval at the (m+1)$^{th}$ iteration.

Seventhly, a first incremental vector and a second incremental vector of the Lagrange multiplier vectors are updated according to formula (14), $$\begin{cases} u^{(m)} = [\lambda^{(m+1)} - \lambda^{(m)}, \underline{\omega}^{(m+1)} - \underline{\omega}^{(m)}, \overline{\omega}^{(m+1)} - \overline{\omega}^{(m)}]^T \\ v^{(m)} = [g_\lambda^{(m+1)} - g_\lambda^{(m)}, g_{\underline{\omega}}^{(m+1)} - g_{\underline{\omega}}^{(m)}, g_{\overline{\omega}}^{(m+1)} - g_{\overline{\omega}}^{(m)}]^T \end{cases} \quad (14)$$

where $u^{(m)}$ represents the first incremental vector, $v^{(m)}$ represents the second incremental vector.

Finally, the approximate matrix is obtained according to the first incremental vector and the second incremental vector according to formula (15), $$B^{(m+1)} = B^{(m)} + \left(1 + \frac{v^{(m)T} B^{(m)} v^{(m)T}}{u^{(m)T} v^{(m)}}\right) \frac{u^{(m)} u^{(m)T}}{u^{(m)T} v^{(m)}} - \frac{u^{(m)} v^{(m)T} B^{(m)} + B^{(m)} v^{(m)} u^{(m)T}}{u^{(m)T} v^{(m)}}. \quad (15)$$

In step 36, whether m is greater than a preset value is judged.

In step 37, if m is not greater than the preset value, step 33 is repeated.

In step 38, if m is greater than the preset value, a plurality of pieces of feasibility information of the plurality of transmission interface constraints are outputted according to the existing flag and the plurality of feasible flags.

Specifically, all transmission interfaces are traversed, if $f_k=1$, the k$^{th}$ transmission interface is infeasible; and if $f_k=0$, the k$^{th}$ transmission interface is feasible. Thus, the infeasible transmission interface constraint is outputted to prompt operators.

In one embodiment, if the infinite norm is converged, each active power of each generator in each dispatching period is transported to each power plant for the online rolling dispatching.

The method for identifying the feasibility of the transmission interface constraint in the online rolling dispatching according to an embodiment of the present disclosure overcomes deficiencies of being unable to identify and deal with the infeasible transmission interface constraints in the online rolling dispatching in the prior art, avoids being unable to provide the generation plan due to the infeasible transmission interface constraints in the online rolling dispatching, and improves the robustness and the practicality of the online rolling dispatching.

The method for identifying the feasibility of the transmission interface constraint in the online rolling dispatching according to an embodiment of the present disclosure uses the criterion based on the weak duality theorem to identify the infeasible transmission interface constraints, which can quickly and accurately identify the infeasible transmission interface constraints only with a very small amount of computations. Therefore, the dispatching period in the power system is reduced.

The method for identifying the feasibility of the transmission interface constraint in the online rolling dispatching according to an embodiment of the present disclosure is easily integrated into the existing online rolling dispatching based on the Lagrangian relaxation dual problem without adjusting the framework of the method, which reduces the operating cost.

The present disclosure also provides a device for identifying a feasibility of a transmission interface constraint in an online rolling dispatching.

Figure 2:
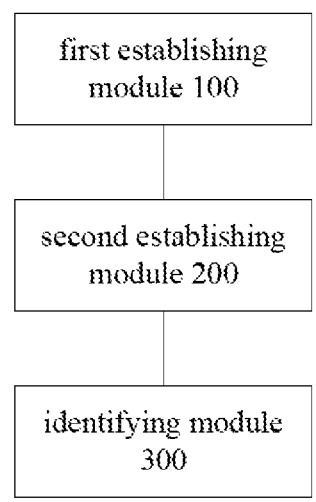
FIG. 2 is a block diagram of a device for identifying a feasibility of a transmission interface constraint in an online rolling dispatching according to an embodiment of the present disclosure.

FIG. 2 is a block diagram of a device for identifying a feasibility of a transmission interface constraint in an online rolling dispatching according to an embodiment of the present disclosure.

As shown in FIG. 2, the device comprises a first establishing module 100, a second establishing module 200, and a identifying module 300.

Specifically, the first establishing module 100 is configured for establishing a dispatching period and a dispatching interval, the second establishing module 200 is configured for establishing a Lagrangian relaxation dual problem of the online rolling dispatching model, and the identifying module 300 is configured for identifying a plurality of feasibilities of the plurality of transmission interface constraints by solving the Lagrangian relaxation dual problem.

In one embodiment, the first establishing module 100 is further configured for executing the following steps.

In step 11, a dispatching period and a dispatching interval are obtained.

For example, the dispatching period is set within the range of 1 to 4 hours, and the dispatching interval between two neighboring dispatching instants is set within the range of 5 to 15 minutes.

In step 12, a number of dispatching intervals is obtained according to the dispatching period and the dispatching interval.

For example, the number of the dispatching intervals is obtained according to formula (16), $$T = \frac{T_{span}}{T_{space}}, \quad (16)$$

where T represents the number of the dispatching intervals, $T_{span}$ represents the dispatching period, and $T_{space}$ represents the dispatching interval.

In step 13, a plurality of quadratic coefficients, a plurality of linear coefficients and a plurality of constant coefficients of generating costs of a plurality of generators are obtained.

For example, the plurality of quadratic coefficients, the plurality of linear coefficients and the plurality of constant coefficients are obtained from coefficients of quadratic terms, linear terms and constant terms of Taylor expansion of the generating costs respectively. The quadratic coefficient of generating costs of all generators is a={$a_{i,t}$|i=1, 2, ..., $N_g$, t=1, 2, ..., T}, the linear coefficient of generating costs of all generators is b={$b_{i,t}$|i=1, 2, ..., $N_g$, t=1, 2, ..., T}, and the constant coefficient of generating costs of all generators is c={$c_{i,t}$|i=1, 2, ..., $N_g$, t=1, 2, ..., T}, where $a_{i,t}$, $b_{i,t}$ and $c_{i,t}$ represent a quadratic coefficient, a linear coefficient and a constant coefficient of the $i^{th}$ generator in the $t^{th}$ dispatching interval respectively.

In step 14, a plurality of generation shift distribution factors of the plurality of generators to corresponding transmission interfaces in the plurality of transmission interfaces are obtained.

In one embodiment, step 14 comprises the following steps.

In step 141, a nodal susceptance matrix is obtained by means of a plurality of branch parameters which are reciprocals of a plurality of branch reactances.

A nodal reactance matrix is obtained according to the nodal susceptance matrix, in which $$X = B_0^{-1},$$

where X represents the nodal reactance matrix and $B_0$ represents the nodal susceptance matrix.

In step 142, k=1 is set.
In step 143, i=1 is set.
In step 144, a plurality of transmission lines of the $k^{th}$ transmission interface are traversed to obtain each generation shift distribution factor of the $i^{th}$ generator to each transmission line according to formula (17), $$\gamma_{l-i} = \frac{X_{ng(i),nbi(l)} - X_{ng(i),nbj(l)}}{x_l} \quad (17)$$

where l represents an $l^{th}$ transmission line, $l \in IL_k$, $IL_k$ represents a set of the transmission lines of the $k^{th}$ transmission interface, ng(i) represents a marker of a node connected to the $i^{th}$ generator, nbi(l) represents a beginning point of the $l^{th}$ transmission line, nbj(l) represents an ending point of the $l^{th}$ transmission line, $X_{ng(i),nbi(l)}$ represents an element in column ng(i) in row nbi(l) in the nodal reactance matrix, $X_{ng(i),nbj(l)}$ represents an element in column ng(i) in row nbj(l) in the nodal reactance matrix, $x_l$ represents a reactance of the $l^{th}$ transmission line.

In step 145, the generation shift distribution factor of the $i^{th}$ generator to the $k^{th}$ transmission interface is obtained according to formula (18).

$$G_{k-i} = \sum_{l \in LL_k} \gamma_{l-i}. \quad (18)$$

In step 146, i=i+1 is set.
Then, whether i is greater than a total number $N_g$ of the generators is judged.
In step 147, if i≤$N_g$, step 144 is repeated.
In step 148, if i>$N_g$, k=k+1 is set, and then whether k is greater than a number K of the transmission interfaces corresponding to the $i^{th}$ generator is judged.
In step 149, if k≤K, step 143 is repeated; and if k>K, step 14 is ended.
In step 15, the online rolling dispatching model is established according to the number of the dispatching intervals, the plurality of quadratic coefficients, the plurality of linear coefficients, the plurality of constant coefficients and the plurality of generation shift distribution factors, in which the online rolling dispatching model is expressed according to formula (1), $$\min_p C(p) = \sum_{t=1}^{T} \sum_{i=1}^{N_s} (a_{i,t} \cdot p_{i,t}^2 + b_{i,t} \cdot p_{i,t} + c_{i,t}) \quad (1)$$

subject to, $$\sum_{i=1}^{N_g} p_{i,t} = D_t, \forall t = 1, 2, \ldots, T \quad (a)$$

$$\underline{L}_{k,t} \leq \sum_{i=1}^{N_g} G_{k,i} \cdot p_{i,t} \leq \overline{L}_{k,t}, \begin{array}{l} \forall k = 1, 2, \ldots, K \\ t = 1, 2, \ldots, T \end{array} \quad (b)$$

$$H_i(p_i) \leq 0, \forall i = 1, 2, \ldots, N_g \quad (c)$$

where t represents a $t^{th}$ dispatching interval, T represents the number of the dispatching intervals, i represents an $i^{th}$ generator, $N_g$ represents a number of the generators, K represents a number of the transmission interfaces corresponding to the $i^{th}$ generator, k represents a $k^{th}$ transmission interface corresponding to the $i^{th}$ generator, p represents a first decision vector, in which p=[$p_1, p_2, \ldots, p_i, \ldots, p_{N_g}$], $p_i$=[$p_{i,1}, p_{i,2}, \ldots, p_{i,t}, \ldots p_{i,T}$] represents an active power vector of the $i^{th}$ generator, $a_{i,t}$, $b_{i,t}$ and $c_{i,t}$ represent a quadratic coefficient, a linear coefficient and a constant coefficient of the $i^{th}$ generator in the $t^{th}$ dispatching interval respectively; formula (1)(a) represents a plurality of minimum generating cost constraints, where $p_{i,t}$ represents an active power of the $i^{th}$ generator in the $t^{th}$ dispatching interval, $D_t$ represents a forecasted load value in the $t^{th}$ dispatching interval; formula (1)(b) represents the plurality of transmission interface constraints, where $\underline{L}_{k,t}$ represents a lower limit of an active power flow of the $k^{th}$ transmission interface in the $t^{th}$ dispatching interval, $\overline{L}_{k,t}$ represents an upper limit of the active power flow of the $k^{th}$ transmission interface in the $t^{th}$ dispatching interval, $G_{k,t}$ represents an generation shift distribution factor of the $i^{th}$ generator to the $k^{th}$ transmission interface; formula (1)(c) represents a plurality of physical constraints.

In one embodiment, the plurality of physical constraints contain a plurality of active power limit constraints and a plurality of active power ramp rate limit constraints.

The plurality of active power limit constraints are expressed according to formula (19)

$$\begin{cases} -p_{i,t} \leq -P_{i,t}^{min} \\ p_{i,t} \leq P_{i,t}^{max} \end{cases}, \forall t = 1, 2, \ldots, T \quad (19)$$

where $P_{i,t}^{min}$ represents a lower limit of the active power of the $i^{th}$ generator in the $t^{th}$ dispatching interval and $P_{i,t}^{max}$ represents an upper limit of the active power of the $i^{th}$ generator in the $t^{th}$ dispatching interval.

The plurality of active power ramp rate limit constraints are expressed according to formula (20)

$$\begin{cases} -p_{i,t} + p_{i,t-1} - RD_{i,t-1} \leq 0 \\ p_{i,t} - p_{i,t-1} - RU_{i,t-1} \leq 0 \end{cases}, \forall t = 1, 2, \ldots, T \quad (20)$$

where $RD_{i,t}$ represents a maximum of down-regulation of the $i^{th}$ generator in the $t^{th}$ dispatching interval and $RU_{i,t}$ represents a maximum of up-regulation of the $i^{th}$ generator in the $t^{th}$ dispatching interval.

Specifically, the transmission interface refers to a set of transmission lines. As expressed according to formula (1)(b), the plurality of transmission interface constraints mean that the limits of the active power flow cannot exceed the specified limits. The infeasible transmission interface constraints refer to the following conditions: when the transmission interface constraints exist in the model expressed by formula (1), formula (1) is infeasible, but when the transmission interface constraints do not exist in the model expressed by formula (1), formula (1) is feasible.

In one embodiment, the Lagrangian relaxation dual problem is expressed according to formula (2), $$\max_{\lambda,\underline{\omega},\overline{\omega}} q(\lambda, \underline{\omega}, \overline{\omega}) \quad (2)$$

subject to, $$\underline{\omega}, \overline{\omega} \geq 0$$

where $q(\lambda,\underline{\omega},\overline{\omega})$ represents a Lagrange dual function in the Lagrangian relaxation dual problem, $\lambda$, $\overline{\omega}$ and $\underline{\omega}$ represent Lagrange multiplier vectors, $\lambda=[\lambda_1, \lambda_2, \ldots, \lambda_T]$, $\underline{\omega}=[\underline{\omega}_{1,1}, \underline{\omega}_{1,2}, \ldots, \underline{\omega}_{1,T}, \ldots, \underline{\omega}_{K,1}, \underline{\omega}_{K,2}, \ldots, \underline{\omega}_{K,T}]$, $\overline{\omega}=[\overline{\omega}_{1,1}, \overline{\omega}_{1,2}, \ldots, \overline{\omega}_{1,T}, \ldots, \overline{\omega}_{K,1}, \overline{\omega}_{K,2}, \ldots, \overline{\omega}_{K,T}]$, in which the Lagrange dual function is expressed according to formula (3), $$q(\lambda, \underline{\omega}, \overline{\omega}) = \sum_{i=1}^{N_g} q_i(\lambda, \underline{\omega}, \overline{\omega}) + K(\lambda, \underline{\omega}, \overline{\omega}) \quad (3)$$

where $q_i(\lambda,\underline{\omega},\overline{\omega})$ represents a child Lagrange dual function corresponding to the $i^{th}$ generator, in which the child Lagrange dual function is expressed according to formula (4), $$q_i(\lambda, \underline{\omega}, \overline{\omega}) = \min_{p_i}\{L_i(p_i, \lambda, \underline{\omega}, \overline{\omega}) \mid p_i \text{ is subject to } H_i(p_i) \leq 0\} \quad (4)$$

where $L_i(p_i,\lambda,\underline{\omega},\overline{\omega})$ represents a child Lagrange function corresponding to the $i^{th}$ generator, in which the child Lagrange function is expressed according to formula (5), $$L_i(p_i, \lambda, \underline{\omega}, \overline{\omega}) = \sum_{t=1}^{T}\left\{a_{i,t} \cdot p_{i,t}^2 + \left[b_{i,t} - \lambda_i + \sum_{k=1}^{K} G_{k,i} \cdot (\overline{\omega}_{k,t} - \underline{\omega}_{k,t})\right]\right\} \quad (5)$$

where $K(\lambda,\underline{\omega},\overline{\omega})$ is expressed according to formula (6), $$K(\lambda, \underline{\omega}, \overline{\omega}) = \sum_{t=1}^{T}\left[\lambda_t \cdot D_t + \sum_{k=1}^{K}(\underline{\omega}_{k,t} \cdot \underline{L}_{k,t} - \overline{\omega}_{k,t} \cdot \overline{L}_{k,t})\right] \quad (6)$$

In one embodiment, the identifying module 300 is further configured for executing the following steps.

In step 31, an iteration number m, the Lagrange multiplier vectors, an approximate matrix, an existing flag of an infeasible transmission interface constraint and a plurality of feasible flags of the plurality of transmission interface constraints are initialized.

For example, the iteration number m=0, the iteration convergence error criterion $\epsilon=0.001$, the maximum iteration number M=1000~10000, the correction step $\alpha=0.8$~0.9995, the feasible flags of the plurality of transmission interface constraints $f=[f_1, f_2, \ldots, f_K]=[0, 0, \ldots, 0]$, and the existing flag flag=0.

Also, the Lagrange multiplier vectors $\lambda^{(0)}=0$, $\underline{\omega}^{(0)}=\overline{\omega}^{(0)}=0$, the approximate matrix $B^{(0)}$ is established and the approximate matrix is a unit matrix which has the same number of columns as $[\lambda,\underline{\omega},\overline{\omega}]$.

In step 32, an infinite norm of subgradients of the Lagrange multipliers at a $m^{th}$ iteration is obtained.

In one embodiment, step 32 comprises the following steps. The subgradients of the Lagrange multipliers at the $m^{th}$ iteration are obtained according to formula (7), $$\begin{cases} g_{\lambda_t}^m = D - \sum_{i=1}^{N_g} p_{i,t}^m, & \forall t = 1, 2, \ldots, T \\ g_{\underline{\omega}_{k,t}}^m = \underline{L}_{k,t} - \sum_{i=1}^{N_g} G_{k,i} \cdot p_{i,t}^m, & \begin{array}{l}\forall k = 1, 2, \ldots, K \\ t = 1, 2, \ldots, T\end{array} \\ g_{\overline{\omega}_{k,t}}^m = \sum_{i=1}^{N_g} G_{k,i} \cdot p_{i,t}^m - \overline{L}_{k,t}, & \begin{array}{l}\forall k = 1, 2, \ldots, K \\ t = 1, 2, \ldots, T\end{array} \end{cases} \quad (7)$$

where m represents the $m^{th}$ iteration, $\lambda_t$ represents a Lagrange multiplier in the $t^{th}$ dispatching interval, $\underline{\omega}_{k,t}$ represents a Lagrange multiplier of the $k^{th}$ transmission interface in the $t^{th}$ dispatching interval, $\overline{\omega}_{k,t}$ represents a Lagrange multiplier of the $k^{th}$ transmission interface in the $t^{th}$ dispatching interval, $g_{\lambda_t}^m$ represents a subgradient of the Lagrange multiplier $\lambda_t$ in the $t^{th}$ dispatching interval at the $m^{th}$ iteration, $g_{\underline{\omega}_{k,t}}^m$ represents a subgradient of the Lagrange multiplier $\underline{\omega}_{k,t}$ of the $k^{th}$ transmission interface in the $t^{th}$ dispatching interval at the $m^{th}$ iteration, $g_{\overline{\omega}_{K,T}}^m$ represents a subgradient of the Lagrange multiplier $\overline{\omega}_{k,t}$ of the $k^{th}$ transmission interface in the $t^{th}$ dispatching interval at the $m^{th}$ iteration. Then, the infinite norm of the subgradients is obtained according to formula (8), $$g_\infty^{(m)}=\max\{|g_{\lambda_t}^{(m)}|,|g_{\underline{\omega}_{k,t}}^{(m)}|,|g_{\overline{\omega}_{k,t}}^{(m)}|\|\forall t=1,2,\ldots,T, k=1,2,\ldots,K\} \quad (8)$$

In step 33, whether the infinite norm is converged is judged.

Specifically, if $g_\infty^{(m)}<\epsilon$, the infinite norm is converged, and if $g_\infty^{(m)}>\epsilon$, the infinite norm is not converged.

In step 34, if the infinite norm is converged, a plurality of pieces of feasibility information of the plurality of transmission interface constraints are outputted according to the existing flag and the plurality of feasible flags.

In step 35, if the infinite norm is not converged, whether there is an infeasible transmission interface constraint is judged.

In one embodiment, step 35 comprises the following steps.

Firstly, an upper limit of the Lagrange dual function is obtained according to formula (9), $$\overline{C} = \sum_{t=1}^{T} \sum_{i=1}^{N_s} [a_{i,t} \cdot (P_{i,t}^{max})^2 + b_{i,t} \cdot P_{i,t}^{max} + c_{i,t}], \quad (9)$$

where $\overline{C}$ represents the upper limit of the Lagrange dual function, $P_{i,t}^{max}$ represents a maximum active power of the $i^{th}$ generator in the $t^{th}$ dispatching interval.

Secondly, an optimal solution $P_i^m$ of formula (4) is obtained by traversing all generators.

Thirdly, $q_i(\lambda^m, \underline{\omega}^m, \overline{\omega}^m)$ is obtained according to the optimal solution $P_i^m$. Then, whether $q_i(\lambda^m, \underline{\omega}^m, \overline{\omega}^m)$ is greater than the upper limit of the Lagrange dual function is judged.

In step 351, if there is an infeasible transmission interface constraint, the existing flag and the plurality of feasible flags are updated, and the infeasible transmission interface constraint is identified and step 31 is repeated.

In one embodiment, step 351 comprises the following steps.

In step 3511, flag=0 is set, where flag represents the existing flag.

In step 3512, k=1 is set, where k represents a number of cycles.

In step 3513, an intermediate parameter $q'_k = q(\lambda^{(m)}, E_k(\underline{\omega}^{(m)}), E_k(\overline{\omega}^{(m)}))$ is obtained according to formula (3), and then whether $q'_k = q(\lambda^{(m)}, E_k(\underline{\omega}^{(m)}), E_k(\overline{\omega}^{(m)}))$ is greater than the upper limit of the Lagrange dual function is judged, in which $E_k(\underline{\omega}^{(m)})$ and $E_k(\overline{\omega}^{(m)})$ are expressed according to formula (10), $$\begin{cases} E_k(\underline{\omega}^{(m)}) = [0, 0, \ldots, 0, \underline{\omega}_{k,1}^{(m)}, \underline{\omega}_{k,2}^{(m)}, \ldots, \underline{\omega}_{k,T}^{(m)}, 0, \ldots, 0] \\ E_k(\overline{\omega}^{(m)}) = [0, 0, \ldots, 0, \overline{\omega}_{k,1}^{(m)}, \overline{\omega}_{k,2}^{(m)}, \ldots, \overline{\omega}_{k,T}^{(m)}, 0, \ldots, 0] \end{cases} \quad (10)$$

In step 3514, if yes, $f_k=1$ and flag=1 are set, where $f_k$ represents the feasible flag of the $k^{th}$ transmission interface constraint, and step 3516 is executed.

In step 3515, if no, k=k+1 and flag=0 are set, and then whether k is greater than K is judged.

In step 35151, if no, step 3513 is repeated.

In step 35152, if yes, step 3516 is executed.

In step 3516, whether flag is 1 is judged.

In step 3517, if no, step 352 is executed.

In step 3518, if yes, $f_k$ are traversed, where k=1, 2, ..., K.

If $f_k=1$, the lower limit of the active power flow of the $k^{th}$ transmission interface constraint in the $t^{th}$ dispatching interval $\underline{L}_{k,t} = -\infty$, $\forall t=1, 2, \ldots, T$ and the upper limit of the active power flow of the $k^{th}$ transmission interface constraint in the $t^{th}$ dispatching interval $\overline{L}_{k,t} = +\infty$, $\forall t=1, 2, \ldots, T$, and step 31 is repeated.

If $f_k=0$, the lower limit and the upper limit of the active power flow of the $k^{th}$ transmission interface constraint in the $t^{th}$ dispatching interval is maintained constant, and step 31 is repeated.

In step 352, if there is no infeasible transmission interface constraint, the Lagrange multiplier vectors and the approximate matrix are updated and m=m+1 is set.

In one embodiment, step 352 comprises the following steps.

Firstly, correction directions of the Lagrange multiplier vectors are obtained according to formula (11), $$[d_\lambda^{(m)}, d_{\underline{\omega}}^{(m)}, d_{\overline{\omega}}^{(m)}] = B^{(m)} \cdot [g_\lambda^{(m)}, g_{\underline{\omega}}^{(m)}, g_{\overline{\omega}}^{(m)}] \quad (11)$$

where $d_\lambda^{(m)}$, $d_{\underline{\omega}}^{(m)}$ and $d_{\overline{\omega}}^{(m)}$ represent the correction directions, in which $d_\lambda^{(m)} = [d_{\lambda_1}^{(m)}, d_{\lambda_2}^{(m)}, \ldots, d_{\lambda_T}^{(m)}]$, $d_{\underline{\omega}}^{(m)} = [d_{\underline{\omega}_{1,1}}^{(m)}, d_{\underline{\omega}_{1,2}}^{(m)}, \ldots, d_{\underline{\omega}_{1,T}}^{(m)}, \ldots, d_{\underline{\omega}_{K,T}}^{(m)}]$ and $d_{\overline{\omega}}^{(m)} = [d_{\overline{\omega}_{1,1}}^{(m)}, d_{\overline{\omega}_{1,2}}^{(m)}, \ldots, d_{\overline{\omega}_{1,T}}^{(m)}, \ldots, d_{\overline{\omega}_{K,T}}^{(m)}]$, $B^{(m)}$ represents the approximate matrix.

Secondly, the Lagrange multiplier vectors are updated according to formula (12), $$\begin{cases} \lambda_t^{(m+1)} = \lambda_t^{(m)} + \alpha \cdot d_{\lambda_t}^{(m)}, & \forall t = 1, 2, \ldots, T \\ \underline{\omega}_{k,t}^{(m+1)} = \max\{\underline{\omega}_{k,t}^{(m)} + \alpha \cdot d_{\underline{\omega}_{k,t}}^{(m)}, 0\}, & \forall k = 1, 2, \ldots, K, \\ & t = 1, 2, \ldots, T \\ \overline{\omega}_{k,t}^{(m+1)} = \max\{\overline{\omega}_{k,t}^{(m)} + \alpha \cdot d_{\overline{\omega}_{k,t}}^{(m)}, 0\}, & \forall k = 1, 2, \ldots, K, \\ & t = 1, 2, \ldots, T \end{cases} \quad (12)$$

where $\lambda^{(m+1)}$, $\underline{\omega}^{(m+1)}$, $\overline{\omega}^{(m+1)}$ represent correction Lagrange multiplier vectors at a $(m+1)^{th}$ iteration;

Thirdly, an optimal solution $P_i^{(m+1)}$ of formula (4) is obtained by traversing all generators.

Fourthly, $q_i(\lambda^{(m+1)}, \underline{\omega}^{(m+1)}, \overline{\omega}^{(m+1)})$ is obtained according to the optimal solution $P_i^{(m+1)}$.

Fifthly, a Lagrange dual function $q(\lambda^{(m+1)}, \underline{\omega}^{(m+1)}, \overline{\omega}^{(m+1)})$ is obtained according to formula (3)

Sixthly, the subgradients of the Lagrange multipliers at the $(m+1)^{th}$ iteration are obtained according to formula (13), $$\begin{cases} g_{\lambda_t}^{(m+1)} = D_t - \sum_{i=1}^{N_g} p_{i,t}^{(m+1)}, & \forall t = 1, 2, \ldots, T \\ g_{\underline{\omega}_{k,t}}^{(m+1)} = \underline{L}_{k,t} - \sum_{i=1}^{N_s} G_{k,i} \cdot p_{i,t}^{(m+1)}, & \forall k = 1, 2, \ldots, K, \\ & t = 1, 2, \ldots, T \\ g_{\overline{\omega}_{k,t}}^{(m+1)} = \sum_{i=1}^{N_g} G_{k,i} \cdot p_{i,t}^{(m+1)} - \overline{L}_{k,t}, & \forall k = 1, 2, \ldots, K, \\ & t = 1, 2, \ldots, T \end{cases} \quad (13)$$

where m+1 represents the $(m+1)^{th}$ iteration, $g_\lambda^{m+1}$ represents a subgradient of the Lagrange multiplier $\lambda_t$ in the $t^{th}$ dispatching interval at the $(m+1)^{th}$ iteration, $g_{\underline{\omega}_{k,t}}^{m+1}$ represents a subgradient of the Lagrange multiplier $\underline{\omega}_{k,t}$ of the $k^{th}$ transmission interface in the $t^{th}$ dispatching interval at the $(m+1)^{th}$ iteration, $g_{\overline{\omega}_{k,t}}^{m+1}$ represents a subgradient of the Lagrange multiplier $\overline{\omega}_{k,t}$ of the $k^{th}$ transmission interface in the $t^{th}$ dispatching interval at the $(m+1)^{th}$ iteration.

Seventhly, a first incremental vector and a second incremental vector of the Lagrange multiplier vectors are updated according to formula (14), $$\begin{cases} u^{(m)} = [\lambda^{(m+1)} - \lambda^{(m)}, \underline{\omega}^{(m+1)} - \underline{\omega}^{(m)}, \overline{\omega}^{(m+1)} - \overline{\omega}^{(m)}]^T \\ v^{(m)} = [g_\lambda^{(m+1)} - g_\lambda^{(m)}, g_{\underline{\omega}}^{(m+1)} - g_{\underline{\omega}}^{(m)}, g_{\overline{\omega}}^{(m+1)} - g_{\overline{\omega}}^{(m)}]^T \end{cases} \quad (14)$$

where $u^{(m)}$ represents the first incremental vector, $v^{(m)}$ represents the second incremental vector.

Finally, the approximate matrix is obtained according to the first incremental vector and the second incremental vector according to formula (15), $$B^{(m+1)} = B^{(m)} + \left(1 + \frac{v^{(m)T} B^{(m)} v^{(m)T}}{u^{(m)T} v^{(m)}}\right) \frac{u^{(m)} u^{(m)T}}{u^{(m)T} v^{(m)}} - \frac{u^{(m)} v^{(m)T} B^{(m)} + B^{(m)} v^{(m)} u^{(m)T}}{u^{(m)T} v^{(m)}}. \quad (15)$$

In step 36, whether m is greater than a preset value is judged.

In step 37, if m is not greater than the preset value, step 33 is repeated.

In step 38, if m is greater than the preset value, a plurality of pieces of feasibility information of the plurality of transmission interface constraints are outputted according to the existing flag and the plurality of feasible flags.

Specifically, all transmission interfaces are traversed, if $f_k=1$, the $k^{th}$ transmission interface is infeasible; and if $f_k=0$, the $k^{th}$ transmission interface is feasible. Thus, the infeasible transmission interface constraint is outputted to prompt operators.

In one embodiment, if the infinite norm is converged, each active power of each generator in each dispatching period is transported to each power plant for the online rolling dispatching.

The device for identifying the feasibility of the transmission interface constraint in the online rolling dispatching according to an embodiment of the present disclosure overcomes deficiencies of being unable to identify and deal with the infeasible transmission interface constraints in the online rolling dispatching in the prior art, avoids being unable to provide the generation plan due to the infeasible transmission interface constraints in the online rolling dispatching, and improves the robustness and the practicality of the online rolling dispatching.

The device for identifying the feasibility of the transmission interface constraint in the online rolling dispatching according to an embodiment of the present disclosure uses the criterion based on the weak duality theorem to identify the infeasible transmission interface constraints, which can quickly and accurately identify the infeasible transmission interface constraints only with a very small amount of computations. Therefore, the dispatching period in the power system is reduced.

The device for identifying the feasibility of the transmission interface constraint in the online rolling dispatching according to an embodiment of the present disclosure is easily integrated into the existing online rolling dispatching based on the Lagrangian relaxation dual problem without adjusting the framework of the method, which reduces the operating cost.

According to an embodiment of the present disclosure, a computer readable storage medium is provided. The computer readable storage medium comprises a computer program for executing the method for identifying the feasibility of the transmission interface constraint in the online rolling dispatching described above when running on a computer.

Any process or method described in the flowing diagram or other means may be understood as a module, segment or portion including one or more executable instruction codes of the procedures configured to achieve a certain logic function or process, and the preferred embodiments of the present disclosure include other performances, in which the performance may be achieved in other orders instead of the order shown or discussed, such as in a almost simultaneous way or in an opposite order, which should be appreciated by those having ordinary skills in the art to which embodiments of the present disclosure belong.

The logic and/or procedures indicated in the flowing diagram or described in other means herein, such as a constant sequence table of the executable code for performing a logical function, may be implemented in any computer readable storage medium so as to be adopted by the code execution system, the device or the equipment (such a system based on the computer, a system including a processor or other systems fetching codes from the code execution system, the device and the equipment, and executing the codes) or to be combined with the code execution system, the device or the equipment to be used. With respect to the description of the present invention, "the computer readable storage medium" may include any device including, storing, communicating, propagating or transmitting program so as to be used by the code execution system, the device and the equipment or to be combined with the code execution system, the device or the equipment to be used. The computer readable medium includes specific examples (a non-exhaustive list): the connecting portion (electronic device) having one or more arrangements of wire, the portable computer disc cartridge (a magnetic device), the random access memory (RAM), the read only memory (ROM), the electrically programmable read only memory (EPROMM or the flash memory), the optical fiber device and the compact disk read only memory (CDROM). In addition, the computer readable storage medium even may be papers or other proper medium printed with program, as the papers or the proper medium may be optically scanned, then edited, interpreted or treated in other ways if necessary to obtain the program electronically which may be stored in the computer memory.

It should be understood that, each part of the present invention may be implemented by the hardware, software, firmware or the combination thereof. In the above embodiments of the present invention, the plurality of procedures or methods may be implemented by the software or hardware stored in the computer memory and executed by the proper code execution system. For example, if the plurality of procedures or methods is to be implemented by the hardware, like in another embodiment of the present invention, any one of the following known technologies or the combination thereof may be used, such as discrete logic circuits having logic gates for implementing various logic functions upon an application of one or more data signals, application specific integrated circuits having appropriate logic gates, programmable gate arrays (PGA), field programmable gate arrays (FPGA).

It can be understood by those having the ordinary skills in the related art that all or part of the steps in the method of the above embodiments can be implemented by instructing related hardware via programs, the program may be stored in a computer readable storage medium, and the program includes one step or combinations of the steps of the method when the program is executed.

In addition, each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium.

The computer readable storage medium may be, but is not limited to, read-only memories, magnetic disks, or optical disks.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example." or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for identifying a feasibility of a transmission interface constraint in an online rolling dispatching, comprising implementing by a programmed computer controlled by executable machine readable instructions, the steps of:
   S1, establishing an online rolling dispatching model including a plurality of transmission interface constraints;
   S2, establishing a Lagrangian relaxation dual problem of the online rolling dispatching model; and
   S3, identifying a plurality of feasibilities of the plurality of transmission interface constraints by solving the Lagrangian relaxation dual problem, wherein step S1 comprises:
   S11, obtaining a dispatching period and a dispatching interval;
   S12, obtaining a number of dispatching intervals according to the dispatching period and the dispatching interval;
   S13, obtaining a plurality of quadratic coefficients, a plurality of linear coefficients and a plurality of constant coefficients of generating costs of a plurality of generators;
   S14, obtaining a plurality of generation shift distribution factors of the plurality of generators to corresponding transmission interfaces in the plurality of transmission interfaces;
   S15, establishing the online rolling dispatching model according to the number of the dispatching intervals, the plurality of quadratic coefficients, the plurality of linear coefficients, the plurality of constant coefficients and the plurality of generation shift distribution factors, to provide a generation plan of online rolling in a power system, wherein the online rolling dispatching model is expressed according to formula (1), $$\min_p C(p) = \sum_{t=1}^{T} \sum_{i=1}^{N_s} (a_{i,t} \cdot p_{i,t}^2 + b_{i,t} \cdot p_{i,t} + c_{i,t}) \quad (1)$$

subject to, $$\sum_{i=1}^{N_s} p_{i,t} = D_t, \forall t = 1, 2, \ldots, T \quad (a)$$

$$\underline{L}_{k,t} \le \sum_{i=1}^{N_g} G_{k,i} \cdot p_{i,t} \le \overline{L}_{k,t}, \begin{array}{l} \forall k = 1, 2, \ldots, K, \\ t = 1, 2, \ldots, T \end{array} \quad (b)$$

$$H_i(p_i) \le 0, \forall i = 1, 2, \ldots, N_g \quad (c)$$

where t represents a $t^{th}$ dispatching interval, T represents the number of the dispatching intervals, i represents an $i^{th}$ generator, $N_g$ represents a number of the generators, K represents a number of the transmission interfaces corresponding to the $i^{th}$ generator, k represents a $k^{th}$ transmission interface corresponding to the $i^{th}$ generator, p represents a first decision vector, in which p=[$p_1$, $p_2$, ..., $p_i$, ..., $p_{N_g}$], $p_i$=[$p_{i,1}$, $p_{i,2}$, ..., $p_{i,t}$, ..., $p_{i,T}$] represents an active power vector of the $i^{th}$ generator, $a_{i,t}$, $b_{i,t}$ and $c_{i,t}$ represent a quadratic coefficient, a linear coefficient and a constant coefficient of the $i^{th}$ generator in the $t^{th}$ dispatching interval respectively; formula (1)(a) represents a plurality of minimum generating cost constraints, where $p_{i,t}$ represents an active power of the $i^{th}$ generator in the $t^{th}$ dispatching interval, $D_t$ represents a forecasted load value in the $t^{th}$ dispatching interval; formula (1)(b) represents the plurality of transmission interface constraints, where $\underline{L}_{k,t}$ represents a lower limit of an active power flow of the $k^{th}$ transmission interface in the $t^{th}$ dispatching interval, $\overline{L}_{k,t}$ represents an upper limit of the active power flow of the $k^{th}$ transmission interface in the $t^{th}$ dispatching interval, $G_{k,i}$ represents an generation shift distribution factor of the $i^{th}$ generator to the $k^{th}$ transmission interface; formula (1)(c) represents a plurality of physical constraints.

2. The method according to claim 1, wherein the Lagrangian relaxation dual problem is expressed according to formula (2), $$\max_{\lambda,\underline{\omega},\overline{\omega}} q(\lambda, \underline{\omega}, \overline{\omega}) \quad (2)$$

subject to, $$\underline{\omega}, \overline{\omega} \ge 0$$

where $q(\lambda,\underline{\omega},\overline{\omega})$ represents a Lagrange dual function in the Lagrangian relaxation dual problem, $\lambda$, $\overline{\omega}$ and $\underline{\omega}$ represent Lagrange multiplier vectors, $\lambda$=[$\lambda_1, \lambda_2, \ldots, \lambda_T$], $\underline{\omega}$=[$\underline{\omega}_{1,1}, \underline{\omega}_{1,2}, \ldots, \underline{\omega}_{1,T}, \ldots, \underline{\omega}_{K,1}, \underline{\omega}_{K,2}, \ldots, \underline{\omega}_{K,T}$], $\overline{\omega}$=[$\overline{\omega}_{1,1}, \overline{\omega}_{1,2}, \ldots, \overline{\omega}_{1,T}, \ldots, \overline{\omega}_{K,1}, \overline{\omega}_{K,2}, \ldots, \overline{\omega}_{K,T}$], in which the Lagrange dual function is expressed according to formula (3), $$q(\lambda, \underline{\omega}, \overline{\omega}) = \sum_{i=1}^{N_g} q_i(\lambda, \underline{\omega}, \overline{\omega}) + K(\lambda, \underline{\omega}, \overline{\omega}) \quad (3)$$

where $q_i(\lambda,\underline{\omega},\overline{\omega})$ represents a child Lagrange dual function corresponding to the $i^{th}$ generator, in which the child Lagrange dual function is expressed according to formula (4), $$q_i(\lambda, \underline{\omega}, \overline{\omega}) = \min_{p_i}\{L_i(p_i, \lambda, \underline{\omega}, \overline{\omega}) \mid p_i \text{ is subject to } H_i(p_i) \le 0\} \quad (4)$$

where $L_i(p_i,\lambda,\underline{\omega},\overline{\omega})$ represents a child Lagrange function corresponding to the $i^{th}$ generator, in which the child Lagrange function is expressed according to formula (5), $$L_i(p_i, \lambda, \underline{\omega}, \overline{\omega}) = \sum_{t=1}^{T} \left\{ a_{i,t} \cdot p_{i,t}^2 + \left[ b_{i,t} - \lambda_t + \sum_{k=1}^{K} G_{k,i} \cdot (\overline{\omega}_{k,t} - \underline{\omega}_{k,t}) \right] \right\} \quad (5)$$

where $K(\lambda,\underline{\omega},\overline{\omega})$ is expressed according to formula (6), $$K(\lambda, \underline{\omega}, \overline{\omega}) = \sum_{t=1}^{T} \left[ \lambda_t \cdot D_t + \sum_{k=1}^{K} (\underline{\omega}_{k,t} \cdot \underline{L}_{k,t} - \overline{\omega}_{k,t} \cdot \overline{L}_{k,t}) \right]. \quad (6)$$

3. The method according to claim 2, wherein step S3 comprises:
   S31, initializing an iteration number m, the Lagrange multiplier vectors, an approximate matrix, an existing flag of an infeasible transmission interface constraint and a plurality of feasible flags of the plurality of transmission interface constraints;
   S32, obtaining an infinite norm of subgradients of the Lagrange multipliers at a $m^{th}$ iteration;
   S33, judging whether the infinite norm is converged;
   S34, if yes, outputting a plurality of pieces of feasibility information of the plurality of transmission interface constraints according to the existing flag and the plurality of feasible flags;
   S35, if no, judging whether there is an infeasible transmission interface constraint;
      S351, if yes, updating the existing flag and the plurality of feasible flags, and identifying the infeasible transmission interface constraint and repeating step S31;
      S352, if no, updating the Lagrange multiplier vectors and the approximate matrix, and setting m=m+1;
   S36, judging whether m is greater than a preset value;
   S37, if no, repeating step S33;
   S38, if yes, outputting a plurality of pieces of feasibility information of the plurality of transmission interface constraints according to the existing flag and the plurality of feasible flags.

4. The method according to claim 3, wherein step S32 comprises:
   obtaining the subgradients of the Lagrange multipliers at the $m^{th}$ iteration according to formula (7), $$\begin{cases} g_{\lambda_t}^m = D - \sum_{i=1}^{N_g} p_{i,t}^m, & \forall t = 1, 2, \ldots, T \\ g_{\underline{\omega}_{k,t}}^m = \underline{L}_{k,t} - \sum_{i=1}^{N_g} G_{k,i} \cdot p_{i,t}^m, & \forall k = 1, 2, \ldots, K, \\ & t = 1, 2, \ldots, T \\ g_{\overline{\omega}_{k,t}}^m = \sum_{i=1}^{N_g} G_{k,i} \cdot p_{i,t}^m - \overline{L}_{k,t}, & \forall k = 1, 2, \ldots, K, \\ & t = 1, 2, \ldots, T \end{cases} \quad (7)$$

where m represents the $m^{th}$ iteration, $\lambda_t$ represents a Lagrange multiplier in the $t^{th}$ dispatching interval, $\underline{\omega}_{k,t}$ represents a Lagrange multiplier of the $k^{th}$ transmission interface in the $t^{th}$ dispatching interval, $\overline{\omega}_{k,t}$ represents a Lagrange multiplier of the $k^{th}$ transmission interface in the $t^{th}$ dispatching interval, $g_{\lambda_t}^m$ represents a subgradient of the Lagrange multiplier $\lambda_t$ in the $t^{th}$ dispatching interval at the $m^{th}$ iteration, $g_{\underline{\omega}_{k,t}}^m$ represents a subgradient of the Lagrange multiplier $\underline{\omega}_{k,t}$ of the $k^{th}$ transmission interface in the $t^{th}$ dispatching interval at the $m^{th}$ iteration, $g_{\overline{\omega}_{k,t}}^m$ represents a subgradient of the Lagrange multiplier $\overline{\omega}_{k,t}$ of the $k^{th}$ transmission interface in the $t^{th}$ dispatching interval at the $m^{th}$ iteration;
   obtaining the infinite norm of the subgradients according to formula (8), $$g_\infty^{(m)} = \max\{|g_{\lambda_t}^{(m)}|, |g_{\underline{\omega}_{k,t}}^{(m)}|, |g_{\overline{\omega}_{k,t}}^{(m)}| \,|\, \forall t=1,2,\ldots,T, k=1,2,\ldots,K\} \quad (8)$$

5. The method according to claim 4, wherein step S35 comprises:
   obtaining an upper limit of the Lagrange dual function according to formula (9), $$\overline{C} = \sum_{t=1}^{T} \sum_{i=1}^{N_g} [a_{i,t} \cdot (P_{i,t}^{max})^2 + b_{i,t} \cdot P_{i,t}^{max} + c_{i,t}], \quad (9)$$

where $\overline{C}$ represents the upper limit of the Lagrange dual function, $P_{i,t}^{max}$ represents a maximum active power of the $i^{th}$ generator in the $t^{th}$ dispatching interval;
   obtaining an optimal solution $P_i^m$ of formula (4) by traversing all generators;
   obtaining $q_i(\lambda^m, \underline{\omega}^m, \overline{\omega}^m)$ according to the optimal solution $P_i^m$;
   judging whether $q_i(\lambda^m, \underline{\omega}^m, \overline{\omega}^m)$ is greater than the upper limit of the Lagrange dual function.

6. The method according to claim 5, wherein step S351 comprises:
   S3511, setting flag=0, where flag represents the existing flag;
   S3512, setting k=1, where k represents a number of cycles;
   S3513, obtaining an intermediate parameter $q'_k = q(\lambda^{(m)}, E_k(\underline{\omega}^{(m)}), E_k(\overline{\omega}^{(m)}))$ according to formula (3) and judging whether $q'_k = q(\lambda^{(m)}, E_k(\underline{\omega}^{(m)}), E_k(\overline{\omega}^{(m)}))$ is greater than the upper limit of the Lagrange dual function, wherein $E_k(\underline{\omega}^{(m)})$ and $E_k(\overline{\omega}^{(m)})$ are expressed according to formula (10), $$\begin{cases} E_k(\underline{\omega}^{(m)}) = [0, 0, \ldots, 0, \underline{\omega}_{k,1}^{(m)}, \underline{\omega}_{k,2}^{(m)}, \ldots, \underline{\omega}_{k,T}^{(m)}, 0, \ldots, 0] \\ E_k(\overline{\omega}^{(m)}) = [0, 0, \ldots, 0, \overline{\omega}_{k,1}^{(m)}, \overline{\omega}_{k,2}^{(m)}, \ldots, \overline{\omega}_{k,T}^{(m)}, 0, \ldots, 0] \end{cases} \quad (10)$$

S3514, if yes, setting $f_k=1$ and flag=1, where $f_k$ represents the feasible flag of the $k^{th}$ transmission interface constraint, and going to step S3516;
   S3515, if no, setting k=k+1 and flag=0, and judging whether k is greater than K;
   S35151, if no, repeating step S3513;
   S35152, if yes, going to step S3516;
   S3516, judging whether flag is 1;
   S3517, if no, going to step S352;
   S3518, if yes, traversing $f_k$, where k=1, 2, . . . , K, if $f_k=1$, setting the lower limit of the active power flow of the $k^{th}$ transmission interface constraint in the $t^{th}$ dispatching interval $\underline{L}_{k,t}=-\infty$, $\forall t=1, 2, \ldots, T$ and the upper limit of the active power flow of the $k^{th}$ transmission interface constraint in the $t^{th}$ dispatching interval $\overline{L}_{k,t}=+\infty$, $\forall t=1, 2, \ldots, T$, and repeating step S31; if $f_k=0$, maintaining the lower limit and the upper limit of the active power flow of the $k^{th}$ transmission interface constraint in the $t^{th}$ dispatching interval constant, and repeating step S31.

7. The method according to claim 5, wherein step S352 comprises:
   obtaining correction directions of the Lagrange multiplier vectors according to formula (11), $$[d_\lambda^{(m)}, d_{\underline{\omega}}^{(m)}, d_{\overline{\omega}}^{(m)}] = B^{(m)} \cdot [g_\lambda^{(m)}, g_{\underline{\omega}}^{(m)}, g_{\overline{\omega}}^{(m)}] \quad (11)$$

where $d_\lambda^{(m)}$, $d_{\underline{\omega}}^{(m)}$ and $d_{\overline{\omega}}^{(m)}$ represent the correction directions, in which $d_\lambda^{(m)} = [d_{\lambda_1}^{(m)}, d_{\lambda_2}^{(m)}, \ldots, d_{\lambda_T}^{(m)}]$, $d_{\underline{\omega}}^{(m)} = [d_{\underline{\omega}_{1,1}}^{(m)}, d_{\underline{\omega}_{1,2}}^{(m)}, \ldots, d_{\underline{\omega}_{1,T}}^{(m)}, \ldots, d_{\underline{\omega}_{K,T}}^{(m)}]$ and $d_{\overline{\omega}}^{(m)} = [d_{\overline{\omega}_{1,1}}^{(m)}, d_{\overline{\omega}_{1,2}}^{(m)}, \ldots, d_{\overline{\omega}_{1,T}}^{(m)}, \ldots, d_{\overline{\omega}_{K,T}}^{(m)}]$, $B^{(m)}$ represents the approximate matrix;
   updating the Lagrange multiplier vectors according to formula (12), $$\begin{cases} \lambda_t^{(m+1)} = \lambda_t^{(m)} + \alpha \cdot d_{\lambda_t}^{(m)}, & \forall t = 1, 2, \ldots, T \\ \omega_{k,t}^{(m+1)} = \max\{\omega_{k,t}^{(m)} + \alpha \cdot d_{\omega_{k,t}}^{(m)}, 0\}, & \begin{array}{l}\forall k = 1, 2, \ldots, K, \\ t = 1, 2, \ldots, T\end{array} \\ \overline{\omega}_{k,t}^{(m+1)} = \max\{\overline{\omega}_{k,t}^{(m)} + \alpha \cdot d_{\overline{\omega}_{k,t}}^{(m)}, 0\}, & \begin{array}{l}\forall k = 1, 2, \ldots, K, \\ t = 1, 2, \ldots, T\end{array} \end{cases} \quad (12)$$

where $\lambda^{(m+1)}$, $\omega^{(m+1)}$, $\overline{\omega}^{(m+1)}$ represent correction Lagrange multiplier vectors at a $(m+1)^{th}$ iteration;

obtaining an optimal solution $P_i^{(m+1)}$ of formula (4) by traversing all generators;

obtaining $q_i(\lambda^{(m+1)}, \omega^{(m+1)}, \overline{\omega}^{(m+1)})$ according to the optimal solution $P_i^{(m+1)}$;

obtaining a Lagrange dual function $q(\lambda^{(m+1)}, \omega^{(m+1)}, \overline{\omega}^{(m+1)})$ according to formula (3);

obtaining subgradients of the Lagrange multipliers at the $(m+1)^{th}$ iteration according to formula (13), $$\begin{cases} g_{\lambda_t}^{(m+1)} = D_t - \sum_{i=1}^{N_g} p_{i,t}^{(m+1)}, & \forall t = 1, 2, \ldots, T \\ g_{\omega_{k,t}}^{(m+1)} = \underline{L}_{k,t} - \sum_{i=1}^{N_g} G_{k,i} \cdot p_{i,t}^{(m+1)}, & \begin{array}{l}\forall k = 1, 2, \ldots, K, \\ t = 1, 2, \ldots, T\end{array} \\ g_{\overline{\omega}_{k,t}}^{(m+1)} = \sum_{i=1}^{N_g} G_{k,i} \cdot p_{i,t}^{(m+1)} - \overline{L}_{k,t}, & \begin{array}{l}\forall k = 1, 2, \ldots, K, \\ t = 1, 2, \ldots, T\end{array} \end{cases} \quad (13)$$

where m+1 represents the $(m+1)^{th}$ iteration, $g_{\lambda_t}^{m+1}$ represents a subgradient of the Lagrange multiplier $\lambda_t$ in the $t^{th}$ dispatching interval at the $(m+1)^{th}$ iteration, $g_{\omega_{k,t}}^{m+1}$ represents a subgradient of the Lagrange multiplier $\omega_{k,t}$ of the $k^{th}$ transmission interface in the $t^{th}$ dispatching interval at the $(m+1)^{th}$ iteration, $g_{\overline{\omega}_{k,T}}^{m+1}$ represents a subgradient of the Lagrange multiplier $\overline{\omega}_{k,t}$ of the $k^{th}$ transmission interface in the $t^{th}$ dispatching interval at the $(m+1)^{th}$ iteration;

updating a first incremental vector and a second incremental vector of the Lagrange multiplier vectors according to formula (14), $$\begin{cases} u^{(m)} = [\lambda^{(m+1)} - \lambda^{(m)}, \omega^{(m+1)} - \omega^{(m)}, \overline{\omega}^{(m+1)} - \overline{\omega}^{(m)}]^T \\ v^{(m)} = [g_\lambda^{(m+1)} - g_\lambda^{(m)}, g_\omega^{(m+1)} - g_\omega^{(m)}, g_{\overline{\omega}}^{(m+1)} - g_{\overline{\omega}}^{(m)}]^T \end{cases} \quad (14)$$

where $u^{(m)}$ represents the first incremental vector, $v^{(m)}$ represents the second incremental vector;

obtaining the approximate matrix according to the first incremental vector and the second incremental vector according to formula (15), $$B^{(m+1)} = B^{(m)} + \left(1 + \frac{v^{(m)T} B^{(m)} v^{(m)T}}{u^{(m)T} v^{(m)}}\right) \frac{u^{(m)} u^{(m)T}}{u^{(m)T} v^{(m)}} - \frac{u^{(m)} v^{(m)T} B^{(m)} + B^{(m)} v^{(m)} u^{(m)T}}{u^{(m)T} v^{(m)}}. \quad (15)$$

8. A device for identifying a feasibility of a transmission interface constraint in an online rolling dispatching, comprising:

a computer;

a first establishing module, configured for establishing an online rolling dispatching model including a plurality of transmission interface constraints;

a second establishing module, configured for establishing a Lagrangian relaxation dual problem of the online rolling dispatching model;

a identifying module, configured for identifying a plurality of feasibilities of the plurality of transmission interface constraints by solving the Lagrangian relaxation dual problem;

a non-transitory computer-readable medium comprising computer-executable instructions stored thereon; and an instruction execution system, which is configured by the instructions to implement at least one of the first establishing module, second establishing module, and identifying module, wherein the first establishing module is further configured for:

obtaining a dispatching period and a dispatching interval;

obtaining a number of dispatching intervals according to the dispatching period and the dispatching interval;

obtaining a plurality of quadratic coefficients, a plurality of linear coefficients and a plurality of constant coefficients of generating costs of a plurality of generators;

obtaining a plurality of generation shift distribution factors of the plurality of generators to corresponding transmission interfaces in the plurality of transmission interfaces;

establishing the online rolling dispatching model according to the number of the dispatching intervals, the plurality of quadratic coefficients, the plurality of linear coefficients, the plurality of constant coefficients and the plurality of generation shift distribution factors, to provide a generation plan of online rolling in a power system, wherein the online rolling dispatching model is expressed according to formula (1), $$\min_p C(p) = \sum_{t=1}^{T} \sum_{i=1}^{N_g} (a_{i,t} \cdot p_{i,t}^2 + b_{i,t} \cdot p_{i,t} + c_{i,t}) \quad (1)$$

subject to.

$$\sum_{i=1}^{N_g} p_{i,t} = D_t, \forall t = 1, 2, \ldots, T \quad (a)$$

$$\underline{L}_{k,t} \leq \sum_{i=1}^{N_g} G_{k,i} \cdot p_{i,t} \leq \overline{L}_{k,t},$$

$$\forall k = 1, 2, \ldots, K, t = 1, 2, \ldots, T \quad (b)$$

$$H_i(p_i) \leq 0, \forall i = 1, 2, \ldots, N_g \quad (c)$$

where t represents a $t^{th}$ dispatching interval, T represents the number of the dispatching intervals, i represents an $i^{th}$ generator, $N_g$ represents a number of the generators, K represents a number of the transmission interfaces corresponding to the $i^{th}$ generator, k represents a $k^{th}$ transmission interface corresponding to the $i^{th}$ generator, p represents a first decision vector, in which p=[$p_1$, $p_2$, ..., $p_i$, ..., $p_{N_g}$], $p_i$=[$p_{i,1}$, $p_{i,2}$, ..., $p_{i,t}$, ..., $p_{i,T}$] represents an active power vector of the $i^{th}$ generator, $a_{i,t}$, $b_{i,t}$ and $c_{i,t}$ represent a quadratic coefficient, a linear coefficient and a constant coefficient of the $i^{th}$ generator in the $t^{th}$ dispatching interval respectively; formula (1)(a) represents a plurality of minimum generating cost constraints, where $p_{i,t}$ represents an active power of the $i^{th}$ generator in the $t^{th}$ dispatching interval, $D_t$ represents a forecasted load value in the $t^{th}$ dispatching interval; formula (1)(b) represents the plurality of transmission interface constraints, where $L_{k,t}$ represents a lower limit of an active power flow of the $k^{th}$ transmission interface in the $t^{th}$ dispatching interval, $\overline{L}_{k,t}$ represents an upper limit of the active power flow of the $k^{th}$ transmission interface in the $t^{th}$ dispatching interval, $G_{k,i}$ represents an generation shift distribution factor of the $i^{th}$ generator to the $k^{th}$ transmission interface; formula (1)(c) represents a plurality of physical constraints.

9. The device according to claim 8, wherein the Lagrangian relaxation dual problem is expressed according to formula (2), $$\max_{\lambda,\underline{\omega},\overline{\omega}} q(\lambda, \underline{\omega}, \overline{\omega}) \quad (2)$$

subject to.

$$\underline{\omega}, \overline{\omega} \geq 0$$

where $q(\lambda,\underline{\omega},\overline{\omega})$ represents a Lagrange dual function in the Lagrangian relaxation dual problem, $\lambda$, $\overline{\omega}$ and $\underline{\omega}$ represent Lagrange multiplier vectors, $\lambda=[\lambda_1, \lambda_2, \ldots, \lambda_T]$, $\underline{\omega}=[\underline{\omega}_{1,1}, \underline{\omega}_{1,2}, \ldots, \underline{\omega}_{1,T}, \ldots, \underline{\omega}_{K,1}, \underline{\omega}_{K,2}, \ldots, \underline{\omega}_{K,T}]$, $\overline{\omega}=[\overline{\omega}_{1,1}, \overline{\omega}_{1,2}, \ldots, \overline{\omega}_{1,T}, \ldots, \overline{\omega}_{K,1}, \overline{\omega}_{K,2}, \ldots, \overline{\omega}_{K,T}]$, in which the Lagrange dual function is expressed according to formula (3), $$q(\lambda, \underline{\omega}, \overline{\omega}) = \sum_{i=1}^{N_g} q_i(\lambda, \underline{\omega}, \overline{\omega}) + K(\lambda, \underline{\omega}, \overline{\omega}) \quad (3)$$

where $q_i(\lambda,\underline{\omega},\overline{\omega})$ represents a child Lagrange dual function corresponding to the $i^{th}$ generator, in which the child Lagrange dual function is expressed according to formula (4), $$q_i(\lambda, \underline{\omega}, \overline{\omega}) = \min_{p_i}\{L_i(p_i, \lambda, \underline{\omega}, \overline{\omega}) \mid p_i \text{ is subject to } H_i(p_i) \leq 0\} \quad (4)$$

where $L_i(p_i,\lambda,\underline{\omega},\overline{\omega})$ represents a child Lagrange function corresponding to the $i^{th}$ generator, in which the child Lagrange function is expressed according to formula (5), $$L_i(p_i, \lambda, \underline{\omega}, \overline{\omega}) = \sum_{t=1}^{T}\left\{\alpha_{i,t} \cdot p_{i,t}^2 + \left[b_{i,t} - \lambda_t + \sum_{k=1}^{K} G_{k,t} \cdot (\overline{\omega}_{k,t} - \underline{\omega}_{k,t})\right]\right\} \quad (5)$$

where $K(\lambda,\underline{\omega},\overline{\omega})$ is expressed according to formula (6), $$K(\lambda, \underline{\omega}, \overline{\omega}) = \sum_{t=1}^{T}\left[\lambda_t \cdot D_t + \sum_{k=1}^{K}(\underline{\omega}_{k,t} \cdot \underline{L}_{k,t} - \overline{\omega}_{k,t} \cdot \overline{L}_{k,t})\right]. \quad (6)$$

10. The device according to claim 9, wherein the identifying module is further configured for:
S31, initializing an iteration number m, the Lagrange multiplier vectors, an approximate matrix, an existing flag of an infeasible transmission interface constraint and a plurality of feasible flags of the plurality of transmission interface constraints;

S32, obtaining an infinite norm of subgradients of the Lagrange multipliers at a $m^{th}$ iteration;

S33, judging whether the infinite norm is converged;

S34, if yes, outputting a plurality of pieces of feasibility information of the plurality of transmission interface constraints according to the existing flag and the plurality of feasible flags;

S35, if no, judging whether there is an infeasible transmission interface constraint;
 S351, if yes, updating the existing flag and the plurality of feasible flags, and identifying the infeasible transmission interface constraint and repeating step S31;
 S352, if no, updating the Lagrange multiplier vectors and the approximate matrix, and setting m=m+1;

S36, judging whether m is greater than a preset value;

S37, if no, repeating step S33;

S38, if yes, outputting a plurality of pieces of feasibility information of the plurality of transmission interface constraints according to the existing flag and the plurality of feasible flags.

11. The device according to claim 10, wherein the identifying module obtains the infinite norm of subgradients of the Lagrange multipliers at the $m^{th}$ iteration by:
obtaining the subgradients of the Lagrange multipliers at the $m^{th}$ iteration according to formula (7), $$\begin{cases} g_{\lambda_t}^m = D - \sum_{i=1}^{N_g} p_{i,t}^m, \forall t = 1, 2, \ldots, T \\ g_{\underline{\omega}_{k,t}}^m = \underline{L}_{k,t} - \sum_{i=1}^{N_g} G_{k,i} \cdot p_{i,t}^m, \forall k = 1, 2, \ldots, K, t = 1, 2, \ldots, T \\ g_{\overline{\omega}_{k,t}}^m = \sum_{i=1}^{N_g} G_{k,i} \cdot p_{i,t}^m - \overline{L}_{k,t}, \forall k = 1, 2, \ldots, K, t = 1, 2, \ldots, T \end{cases} \quad (7)$$

where m represents the $m^{th}$ iteration, $\lambda_t$ represents a Lagrange multiplier in the $t^{th}$ dispatching interval, $\underline{\omega}_{k,t}$ represents a Lagrange multiplier of the $k^{th}$ transmission interface in the $t^{th}$ dispatching interval, $\overline{\omega}_{k,t}$ represents a Lagrange multiplier of the $k^{th}$ transmission interface in the $t^{th}$ dispatching interval, $g_{\lambda_t}^m$ represents a subgradient of the Lagrange multiplier $\lambda_t$ in the $t^{th}$ dispatching interval at the $m^{th}$ iteration, $g_{\underline{\omega}_{k,t}}^m$ represents a subgradient of the Lagrange multiplier $\underline{\omega}_{k,t}$ of the $k^{th}$ transmission interface in the $t^{th}$ dispatching interval at the $m^{th}$ iteration, $g_{\overline{\omega}_{k,T}}^m$ represents a subgradient of the Lagrange multiplier $\overline{\omega}_{k,t}$ of the $k^{th}$ transmission interface in the $t^{th}$ dispatching interval at the $m^{th}$ iteration;
obtaining the infinite norm of the subgradients according to formula (8), $$g_\infty^{(m)} = \max\{|g_{\lambda_t}^{(m)}|, |g_{\underline{\omega}_{k,t}}^{(m)}|, |g_{\overline{\omega}_{k,t}}^{(m)}|| \forall t=1,2,\ldots,T, k=1,2,\ldots,K\} \quad (8).$$

12. The device according to claim 11, wherein the identifying module judges whether there is an infeasible transmission interface constraint by:
obtaining an upper limit of the Lagrange dual function according to formula (9), $$\overline{C} = \sum_{t=1}^{T}\sum_{i=1}^{N_g}[a_{i,t} \cdot (P_{i,t}^{max})^2 + b_{i,t} \cdot P_{i,t}^{max} + c_{i,t}], \quad (9)$$

where $\overline{C}$ represents the upper limit of the Lagrange dual function, $P_{i,t}^{max}$ represents a maximum active power of the $i^{th}$ generator in the $t^{th}$ dispatching interval;

obtaining an optimal solution $P_i^m$ of formula (4) by traversing all generators;

obtaining $q_i(\lambda^m, \underline{\omega}^m, \overline{\omega}^m)$ according to the optimal solution $P_i^m$;

judging whether $q_i(\lambda^m, \underline{\omega}^m, \overline{\omega}^m)$ is greater than the upper limit of the Lagrange dual function.

13. The device according to claim 12, wherein the identifying module updates the existing flag and the plurality of feasible flags, and identifies the infeasible transmission interface constraint and repeats step S31 by:

S3511, setting flag=0, where flag represents the existing flag;

S3512, setting k=1, where k represents a number of cycles;

S3513, obtaining an intermediate parameter $q'_k = q(\lambda^{(m)}, E_k(\underline{\omega}^{(m)}), E_k(\overline{\omega}^{(m)}))$ according to formula (3) and judging whether $q'_k = q(\lambda^{(m)}, E_k(\underline{\omega}^{(m)}), E_k(\overline{\omega}^{(m)}))$ is greater than the upper limit of the Lagrange dual function, wherein $E_k(\underline{\omega}^{(m)})$ and $E_k(\overline{\omega}^{(m)})$ are expressed according to formula (10), $$\begin{cases} E_k(\underline{\omega}^{(m)}) = [0, 0, \ldots, 0, \underline{\omega}_{k,1}^{(m)}, \underline{\omega}_{k,2}^{(m)}, \ldots, \underline{\omega}_{k,T}^{(m)}, 0, \ldots, 0] \\ E_k(\overline{\omega}^{(m)}) = [0, 0, \ldots, 0, \overline{\omega}_{k,1}^{(m)}, \overline{\omega}_{k,2}^{(m)}, \ldots, \overline{\omega}_{k,T}^{(m)}, 0, \ldots, 0] \end{cases} \quad (10)$$

S3514, if yes, setting $f_k=1$ and flag=1, where $f_k$ represents the feasible flag of the $k^{th}$ transmission interface constraint, and going to step S3516;

S3515, if no, setting k=k+1 and flag=0, and judging whether k is greater than K;

S35151, if no, repeating step S3513;

S35152, if yes, going to step S3516;

S3516, judging whether flag is 1;

S3517, if no, going to step S352;

S3518, if yes, traversing $f_k$, where k=1, 2, ..., K, if $f_k$=1, setting the lower limit of the active power flow of the $k^{th}$ transmission interface constraint in the $t^{th}$ dispatching interval $\underline{L}_{k,t}$=−∞, ∀t=1, 2, ..., T and the upper limit of the active power flow of the $k^{th}$ transmission interface constraint in the $t^{th}$ dispatching interval $\overline{L}_{k,t}$=+∞, ∀t=1, 2, ..., T, and repeating step S31; if $f_k$=0, maintaining the lower limit and the upper limit of the active power flow of the $k^{th}$ transmission interface constraint in the $t^{th}$ dispatching interval constant, and repeating step S31.

14. The device according to claim 12, wherein the identifying module updates the Lagrange multiplier vectors and the approximate matrix, and sets m=m+1 by:

obtaining correction directions of the Lagrange multiplier vectors according to formula (11), $$[d_\lambda^{(m)}, d_{\underline{\omega}}^{(m)}, d_{\overline{\omega}}^{(m)}] = B^{(m)} \cdot [g_\lambda^{(m)}, g_{\underline{\omega}}^{(m)}, g_{\overline{\omega}}^{(m)}] \quad (11)$$

where $d_\lambda^{(m)}$, $d_{\underline{\omega}}^{(m)}$ and $d_{\overline{\omega}}^{(m)}$ represent the correction directions, in which $d_\lambda^{(m)} = [d_{\lambda_1}^{(m)}, d_{\lambda_2}^{(m)}, \ldots, d_{\lambda_T}^{(m)}]$, $d_{\underline{\omega}}^{(m)} = [d_{\underline{\omega}_{1,1}}^{(m)}, d_{\underline{\omega}_{1,2}}^{(m)}, \ldots, d_{\underline{\omega}_{1,T}}^{(m)}, \ldots, d_{\underline{\omega}_{K,T}}^{(m)}]$ and $d_{\overline{\omega}}^{(m)} = [d_{\overline{\omega}_{1,1}}^{(m)}, d_{\overline{\omega}_{1,2}}^{(m)}, \ldots, d_{\overline{\omega}_{1,T}}^{(m)}, \ldots, d_{\overline{\omega}_{K,T}}^{(m)}]$, $B^{(m)}$ represents the approximate matrix;

updating the Lagrange multiplier vectors according to formula (12), $$\begin{cases} \lambda_t^{(m+1)} = \lambda_t^{(m)} + \alpha \cdot d_{\lambda_t}^{(m)}, \forall t = 1, 2, \ldots, T \\ \underline{\omega}_{k,t}^{(m+1)} = \max\{\underline{\omega}_{k,t}^{(m)} + \alpha \cdot d_{\underline{\omega}_{k,t}}^{(m)}, 0\}, \forall k = 1, 2, \ldots, K, t = 1, 2, \ldots, T \\ \overline{\omega}_{k,t}^{(m+1)} = \max\{\overline{\omega}_{k,t}^{(m)} + \alpha \cdot d_{\overline{\omega}_{k,t}}^{(m)}, 0\}, \forall k = 1, 2, \ldots, K, t = 1, 2, \ldots, T \end{cases} \quad (12)$$

where $\lambda^{(m+1)}$, $\underline{\omega}^{(m+1)}$, $\overline{\omega}^{(m+1)}$ represent correction Lagrange multiplier vectors at a $(m+1)^{th}$ iteration;

obtaining an optimal solution $P_i^{(m+1)}$ of formula (4) by traversing all generators;

obtaining $q_i(\lambda^{(m+1)}, \underline{\omega}^{(m+1)}, \overline{\omega}^{(m+1)})$ according to the optimal solution $P_i^{(m+1)}$;

obtaining a Lagrange dual function $q(\lambda^{(m+1)}, \underline{\omega}^{(m+1)}, \overline{\omega}^{(m+1)})$ according to formula (3);

obtaining subgradients of the Lagrange multipliers at the $(m+1)^{th}$ iteration according to formula (13), $$\begin{cases} g_{\lambda_t}^{(m+1)} = D_t - \sum_{i=1}^{N_g} p_{i,t}^{(m+1)}, \forall t = 1, 2, \ldots, T \\ g_{\underline{\omega}_{k,t}}^{(m+1)} = \underline{L}_{k,t} - \sum_{i=1}^{N_g} G_{k,i} \cdot p_{i,t}^{(m+1)}, \forall k = 1, 2, \ldots, K, t = 1, 2, \ldots, T \\ g_{\overline{\omega}_{k,t}}^{(m+1)} = \sum_{i=1}^{N_g} G_{k,i} \cdot p_{i,t}^{(m+1)} - \overline{L}_{k,t}, \forall k = 1, 2, \ldots, K, t = 1, 2, \ldots, T \end{cases} \quad (13)$$

where m+1 represents the $(m+1)^{th}$ iteration, $g_{\lambda_t}^{m+1}$ represents a subgradient of the Lagrange multiplier $\lambda_t$ in the $t^{th}$ dispatching interval at the $(m+1)^{th}$ iteration, $g_{\underline{\omega}_{k,t}}^{m+1}$ represents a subgradient of the Lagrange multiplier $\underline{\omega}_{k,t}$ of the $k^{th}$ transmission interface in the $t^{th}$ dispatching interval at the $(m+1)^{th}$ iteration, $g_{\overline{\omega}_{K,T}}^{m+1}$ represents a subgradient of the Lagrange multiplier $\overline{\omega}_{k,t}$ of the $k^{th}$ transmission interface in the $t^{th}$ dispatching interval at the $(m+1)^{th}$ iteration;

updating a first incremental vector and a second incremental vector of the Lagrange multiplier vectors according to formula (14), $$\begin{cases} u^{(m)} = [\lambda^{(m+1)} - \lambda^{(m)}, \underline{\omega}^{(m+1)} - \underline{\omega}^{(m)}, \overline{\omega}^{(m+1)} - \overline{\omega}^{(m)}]^T \\ v^{(m)} = [g_\lambda^{(m+1)} - g_\lambda^{(m)}, g_{\underline{\omega}}^{(m+1)} - g_{\underline{\omega}}^{(m)}, g_{\overline{\omega}}^{(m+1)} - g_{\overline{\omega}}^{(m)}]^T \end{cases} \quad (14)$$

where $u^{(m)}$ represents the first incremental vector, $v^{(m)}$ represents the second incremental vector;

obtaining the approximate matrix according to the first incremental vector and the second incremental vector according to formula (15), $$B^{(m+1)} = B^{(m)} + \left(1 + \frac{v^{(m)T} B^{(m)} v^{(m)T}}{u^{(m)T} v^{(m)}}\right) \frac{u^{(m)} u^{(m)T}}{u^{(m)T} v^{(m)}} - \frac{u^{(m)} v^{(m)T} B^{(m)} + B^{(m)} v^{(m)} u^{(m)T}}{u^{(m)T} v^{(m)}}. \quad (15)$$

15. A non-transitory computer readable storage medium, comprising a computer program for executing steps of:

S1, establishing an online rolling dispatching model including a transmission interface constraint;

S2, establishing a Lagrangian relaxation dual problem of the online rolling dispatching model; and S3, identifying a feasibility of the transmission interface constraint by solving the Lagrangian relaxation dual problem, wherein step S1 comprises:

S11, obtaining a dispatching period and a dispatching interval;

S12, obtaining a number of dispatching intervals according to the dispatching period and the dispatching interval;

S13, obtaining a plurality of quadratic coefficients, a plurality of linear coefficients and a plurality of constant coefficients of generating costs of a plurality of generators;

S14, obtaining a plurality of generation shift distribution factors of the plurality of generators to corresponding transmission interfaces in the plurality of transmission interfaces;

S15, establishing the online rolling dispatching model according to the number of the dispatching intervals, the plurality of quadratic coefficients, the plurality of linear coefficients, the plurality of constant coefficients and the plurality of generation shift distribution factors, to provide a generation plan of online rolling in a power system, wherein the online rolling dispatching model is expressed according to formula (1), $$\min_p C(p) = \sum_{t=1}^{T} \sum_{i=1}^{N_g} (a_{i,t} \cdot p_{i,t}^2 + b_{i,t} \cdot p_{i,t} + c_{i,t}) \quad (1)$$

subject to.

$$\sum_{i=1}^{N_g} p_{i,t} = D_t, \forall\, t = 1, 2, \ldots, T \quad (a)$$

$$\underline{L}_{k,t} \leq \sum_{i=1}^{N_g} G_{k,i} \cdot p_{i,t} \leq \overline{L}_{k,t}, \forall\, k = 1, 2, \ldots, K, t = 1, 2, \ldots, T \quad (b)$$

$$H_i(p_i) \leq 0, \forall\, i = 1, 2, \ldots, N_g \quad (c)$$

where t represents a $t^{th}$ dispatching interval, T represents the number of the dispatching intervals, i represents an $i^{th}$ generator, $N_g$ represents a number of the generators, K represents a number of the transmission interfaces corresponding to the $i^{th}$ generator, k represents a $k^{th}$ transmission interface corresponding to the $i^{th}$ generator, p represents a first decision vector, in which p=[$p_1$, $p_2$, ..., $p_i$, ..., $p_{N_g}$], $p_i$=[$p_{i,1}$, $p_{i,2}$, ..., $p_{i,t}$, ..., $p_{i,T}$] represents an active power vector of the $i^{th}$ generator, $a_{i,t}$, $b_{i,t}$ and $c_{i,t}$ represent a quadratic coefficient, a linear coefficient and a constant coefficient of the $i^{th}$ generator in the $t^{th}$ dispatching interval respectively; formula (1)(a) represents a plurality of minimum generating cost constraints, where $p_{i,t}$ represents an active power of the $i^{th}$ generator in the $t^{th}$ dispatching interval, $D_t$ represents a forecasted load value in the $t^{th}$ dispatching interval; formula (1)(b) represents the plurality of transmission interface constraints, where $\underline{L}_{k,t}$ represents a lower limit of an active power flow of the $k^{th}$ transmission interface in the $t^{th}$ dispatching interval, $\overline{L}_{k,t}$ represents an upper limit of the active power flow of the $k^{th}$ transmission interface in the $t^{th}$ dispatching interval, $G_{k,i}$ represents an generation shift distribution factor of the $i^{th}$ generator to the $k^{th}$ transmission interface; formula (1)(c) represents a plurality of physical constraints.

* * * * *